US010477184B2

(12) United States Patent
Surma et al.

(10) Patent No.: US 10,477,184 B2
(45) Date of Patent: Nov. 12, 2019

(54) PHOTOGRAPHY SYSTEM WITH DEPTH AND POSITION DETECTION

(71) Applicant: Lifetouch Inc., Eden Prairie, MN (US)

(72) Inventors: Michael J. Surma, Eagan, MN (US); Jolinda K. Conzemius, Eagan, MN (US)

(73) Assignee: Lifetouch Inc., Eden Prairie, MN (US)

( * ) Notice: Subject to any disclaimer, the term of this patent is extended or adjusted under 35 U.S.C. 154(b) by 290 days.

(21) Appl. No.: 13/777,579

(22) Filed: Feb. 26, 2013

(65) Prior Publication Data
US 2013/0265396 A1   Oct. 10, 2013

Related U.S. Application Data

(60) Provisional application No. 61/620,254, filed on Apr. 4, 2012.

(51) Int. Cl.
*H04N 13/239* (2018.01)
*G03B 13/18* (2006.01)
*G06T 7/70* (2017.01)
*H04N 5/232* (2006.01)
*H04N 5/222* (2006.01)
*H04N 5/272* (2006.01)
*G03B 15/07* (2006.01)

(52) U.S. Cl.
CPC ............ *H04N 13/239* (2018.05); *G03B 13/18* (2013.01); *G06T 7/70* (2017.01); *G03B 15/07* (2013.01); *G06T 2207/10016* (2013.01); *G06T 2207/10021* (2013.01); *G06T 2207/10028* (2013.01); *G06T 2207/30196* (2013.01); *H04N 5/2226* (2013.01); *H04N 5/23219* (2013.01); *H04N 2005/2726* (2013.01)

(58) Field of Classification Search
CPC .......... G06T 2201/0051; G06T 7/0075; G06K 9/00791; H04N 13/0239; H04N 13/0055; H04N 13/0296; H04N 13/0221; H04N 2201/327
USPC ................. 348/46, 47, 42, 50; 382/106, 100
See application file for complete search history.

(56) References Cited

U.S. PATENT DOCUMENTS

| | | | | |
|---|---|---|---|---|
| 5,682,557 A * | 10/1997 | Harada | ................... | G03B 17/38 396/59 |
| 7,742,894 B2 * | 6/2010 | Chen | .................... | A61B 5/1038 340/573.1 |
| 2002/0080148 A1 * | 6/2002 | Uchino | ................... | G06T 15/50 345/629 |
| 2003/0202120 A1 * | 10/2003 | Mack | ...................... | G06T 15/20 348/578 |
| 2003/0234871 A1 * | 12/2003 | Squilla | .................... | G06T 11/60 348/220.1 |
| 2007/0025722 A1 * | 2/2007 | Matsugu | ................ | G03B 17/16 396/263 |

(Continued)

*Primary Examiner* — Mohammed S Rahaman
*Assistant Examiner* — Jimmy S Lee
(74) *Attorney, Agent, or Firm* — Xin Wen

(57) ABSTRACT

A photography system includes a digital camera and a depth and position detection device. The digital camera is configured to capture a digital image of a subject. The depth and position detection device scans the subject and determines three-dimensional locations of the subject and any other objects within the field of view. The depth and position detection device also determines locations of body points of the subject. The depth and position information can then be mapped to the digital image.

7 Claims, 27 Drawing Sheets

(56) References Cited

U.S. PATENT DOCUMENTS

| | | | | |
|---|---|---|---|---|
| 2007/0263903 | A1* | 11/2007 | St Hilaire | G01B 11/25 382/106 |
| 2008/0246777 | A1* | 10/2008 | Swanson | H04N 5/2256 345/640 |
| 2009/0109280 | A1* | 4/2009 | Gotsman | H04N 5/2628 348/39 |
| 2009/0138805 | A1* | 5/2009 | Hildreth | G06K 9/00335 715/745 |
| 2009/0244309 | A1* | 10/2009 | Maison | G06K 9/00369 348/222.1 |
| 2010/0118116 | A1* | 5/2010 | Tomasz | G01C 11/02 348/36 |
| 2010/0165081 | A1* | 7/2010 | Jung | H04N 13/178 348/46 |
| 2010/0283837 | A1* | 11/2010 | Oohchida | G06T 7/0075 348/47 |
| 2011/0054870 | A1* | 3/2011 | Dariush | G06F 3/011 703/11 |
| 2011/0169921 | A1* | 7/2011 | Lee | H04N 5/23212 348/46 |
| 2012/0133746 | A1* | 5/2012 | Bigioi | H04N 5/23219 348/50 |
| 2012/0294510 | A1* | 11/2012 | Zhang | G06K 9/2036 382/154 |
| 2012/0309532 | A1* | 12/2012 | Ambrus | G06F 3/0425 463/36 |
| 2013/0003128 | A1* | 1/2013 | Watanabe | G03B 35/08 358/1.15 |

\* cited by examiner

PHOTOGRAPHY SYSTEM WITH DEPTH AND POSITION DETECTION

CROSS-REFERENCE TO RELATED APPLICATION

This application claims priority to U.S. Patent Application Ser. No. 61/620,254, filed on Apr. 4, 2012, and entitled PHOTOGRAPHY STATION WITH DEPTH AND POSITION DETECTION, the disclosure of which is incorporated by reference herein in its entirety.

BACKGROUND

Portrait photography is often performed within a photography station. During a photography session, a subject is arranged within the field of view of a camera and positioned forward of a background. At the appropriate time, the photographer presses a capture button associated with the camera. Flash lighting is synchronized with the camera to illuminate the subject while the camera captures the photograph of the subject.

Through the typical photography process, little is known about the physical characteristics of the subject. If it is desired to obtain additional information about the subject's physical characteristics, subsequent complex processing must be performed on the digital image, or manual review of the photographs must be performed. For example, face finding software is available to locate the position of the subject's face. Such techniques are not always reliable, and suffer from numerous limitations. Manual review of digital images is time consuming and prone to error. Accordingly, it would be beneficial to obtain additional information about the subject's physical characteristics in the photograph at the time that the photograph is captured.

SUMMARY

In general terms, this disclosure is directed to a photography system. In one possible configuration and by non-limiting example, the photography system includes digital camera and a depth and position detection device. The digital camera is configured to capture a digital image of the subject. The depth and position detection device generates depth data associated with the subject. In some embodiments the depth and position detection device also identifies the positions of subject's body points. The depth and position data can then be mapped to the digital image captured by the digital camera.

One aspect is a photography system comprising: a digital camera arranged and configured to capture a digital image of a subject; a depth detector including a second digital camera and arranged and configured to scan the subject and generate depth data identifying at least a distance of the subject when the digital image is captured by the digital camera; and at least one computing device arranged and configured to receive the digital image from the digital camera and the depth data from the depth detector and store the digital image and the depth data in at least one computer readable storage device.

Another aspect is a photography method comprising: capturing a digital image of a subject with a digital camera; and detecting at least a distance of the subject using a depth detector and generating depth data identifying at least the distance, the depth detector comprising a second digital camera.

A further aspect is a system comprising: a digital camera arranged and configured to capture a digital image of a subject and a background during a portrait photography session; a depth detector comprising a second digital camera, wherein the depth detector is arranged and configured to detect distances that the subject and the background are away from the depth detector when the digital image is captured by the digital camera, and to generate depth data based on the distances; and a computing device arranged and configured to receive the digital image from the digital camera and the depth data from the depth detector and store the digital image and the depth data in a computer readable storage device.

Another aspect is a photography method comprising: capturing a digital image of a subject and a background with a digital camera; detecting a distance between a depth detector and the subject and a distance between the depth detector and the background and generating depth data identifying the distances, wherein the depth detector comprises a second digital camera; and transferring the digital image and the depth data to a computing device and storing the depth data so that it is associated with the digital image in a computer readable storage medium.

A further aspect is a method of determining a body position of a subject in a digital image, the method comprising: capturing a digital image and generating depth data, wherein the depth data further comprises data identifying body point positions of the subject's body; comparing one or more body point positions to pose definition data; and determining whether the one or more body point positions match the pose definition data.

Yet another aspect is a method of inserting an image of a subject into a scene, the method comprising: capturing a digital image and generating depth data, wherein the depth data further comprises data identifying body point positions of the subject's body; separating a subject portion of the digital image from a background portion; identifying a scene art image template that is compatible with the body point positions of the subject in the digital image; scaling the subject portion of the digital image to the scene art image template; and arranging the subject portion of the digital image in the scene art image template based at least in part on at least one of the body point positions.

Another aspect is a method of identifying a characteristic of an article of clothing worn by a subject in a digital image, the method comprising: capturing a digital image and generating depth data, wherein the depth data further comprises data identifying body point positions of the subject's body; finding the article of clothing using at least some of the body point positions; and evaluating the characteristic of the article of clothing.

Yet another aspect is a method of estimating a weight of a subject in a digital image, the method comprising: capturing the digital image of a subject; generating depth data defining distances associated with the subject; and computing an estimate of the subject's weight using the depth data.

A further aspect is a method of inserting an image of a subject into a scene, the method comprising: capturing the digital image and generating depth data identifying distances between objects captured in the digital image; separating a subject portion of the digital image from a background portion; determining at least one of: a primary color of an article of clothing worn by the subject and an estimate of the subject's weight; and arranging the subject portion of the digital image into a scene art image using at least one of the primary color and the estimate of the subject's weight.

DETAILED DESCRIPTION

Figure 1:
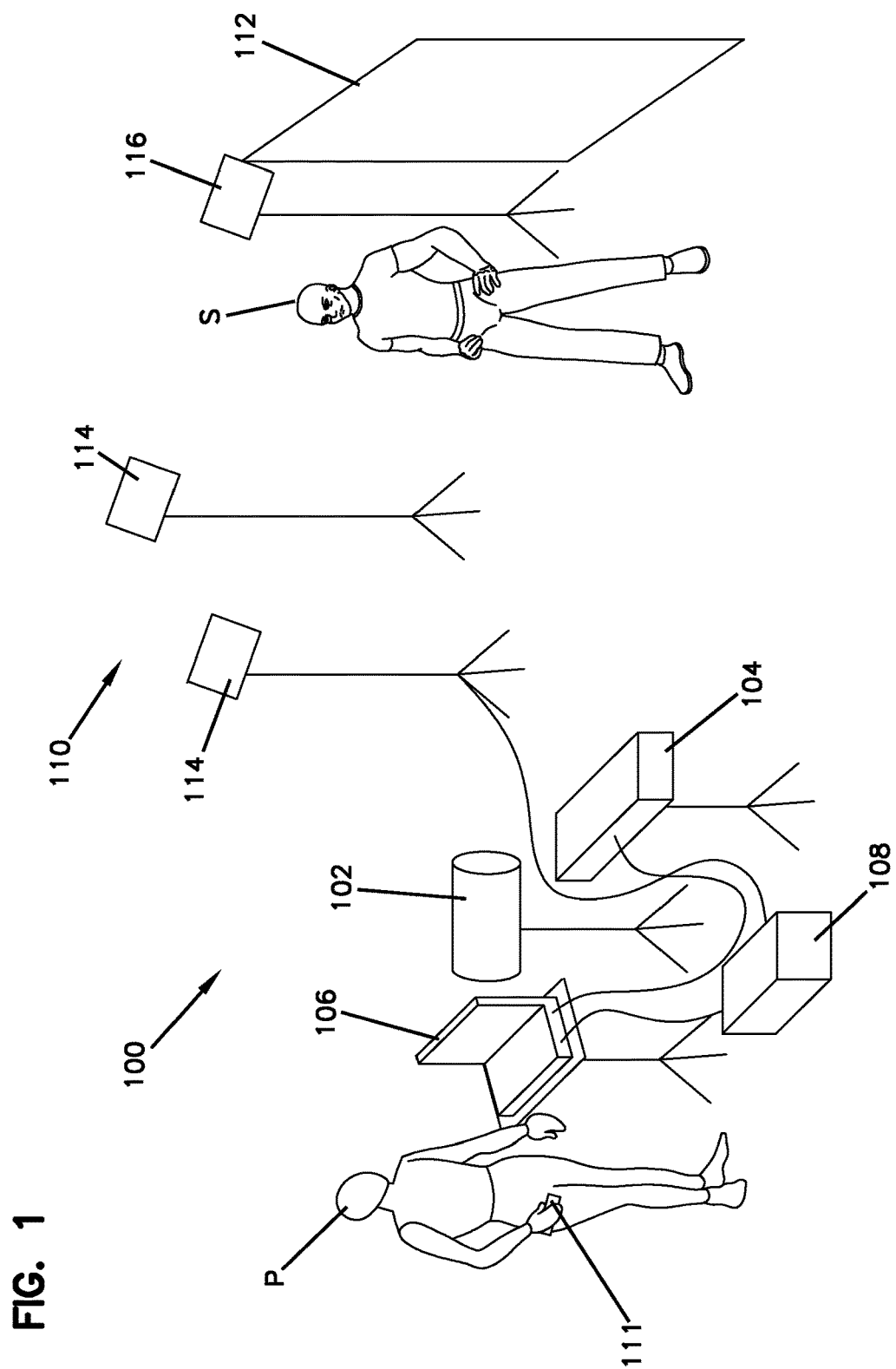
FIG. 1 is a schematic perspective view of an example photography station according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A photography station is disclosed that captures high quality digital images of a subject, while also capturing additional depth and position information. The depth information identifies, for example, the distance of the subject from a camera at the time that the digital image is captured. The position information identifies the position of the subject's body. Subsequent techniques for using this information are also disclosed. Many of these techniques can be used to automate the processing of digital images, greatly simplifying the process of generating digital products from the digital images.

Figure 2:
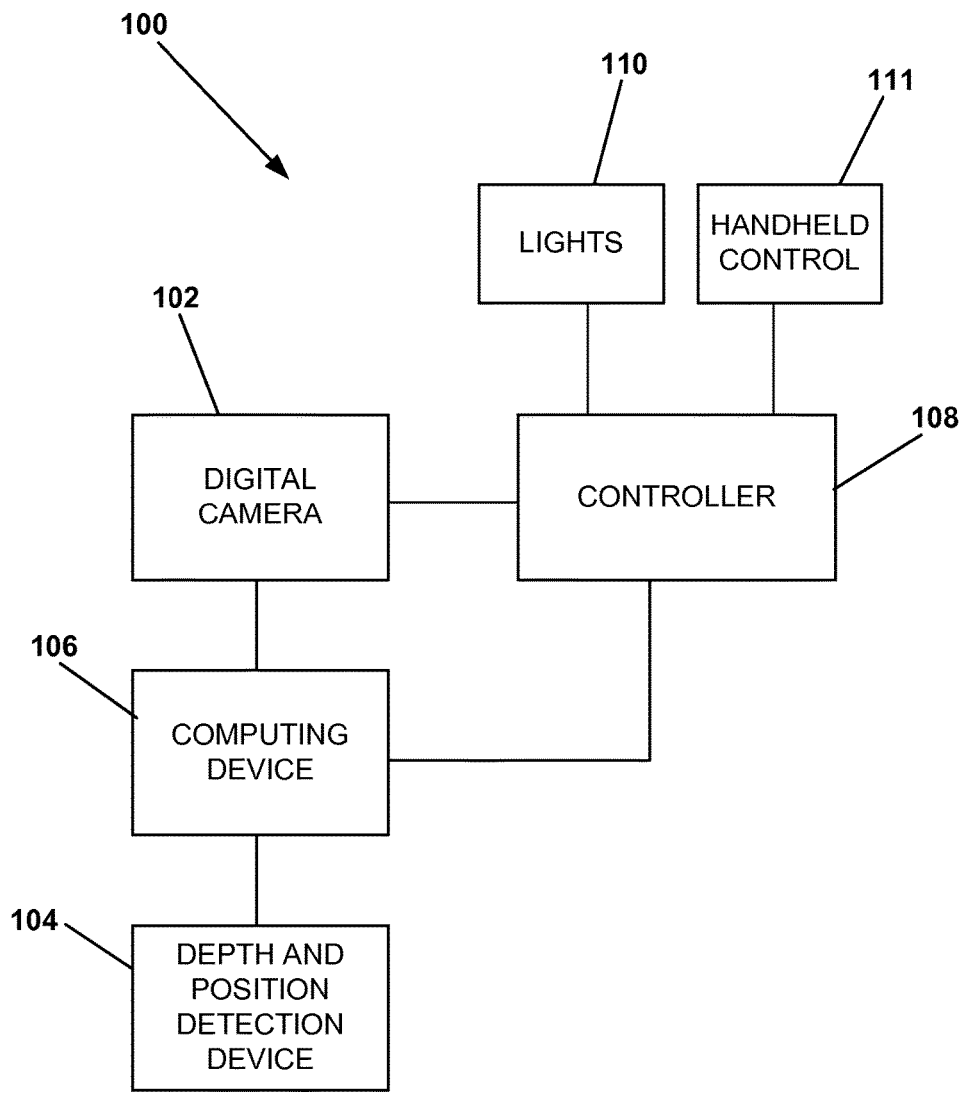
FIG. 2 is a schematic block diagram of the photography station shown in FIG. 1.

FIGS. 1 and 2 illustrate an example photography station 100. FIG. 1 is a schematic perspective view of the example photography station 100, and FIG. 2 is a schematic block diagram of the example photography station 100. The photography station 100 includes a digital camera 102, a depth and position detection device 104, and a computing device 106. In some embodiments, the photography station 100 further includes one or more of: a controller 108, lights 110, a handheld control 111, and a background 112. The lights 110 can include one or more lights, such as foreground lighting 114 and background lighting 116.

The photography station 100 operates to capture one or more photographs of one or more subjects S, and can also operate to collect additional information about the subject, such as depth data and body position data, as described herein. In some embodiments, the photography station 100 is controlled by a photographer P, who interacts with the subject to guide the subject to a good expression, and indicates to the photography station when the image should be captured.

The digital camera 102 operates to capture digital images of the subject S. The digital camera 102 is typically a professional quality digital camera that captures high quality photographs. In some embodiments, the digital camera 102 includes calibrated color and exposure control as well as optics (e.g., lenses and filters) that are optimized for portraiture. An example of the digital camera 102 is illustrated and described in more detail with reference to FIG. 3.

The depth and position detection device 104 operates to detect the depth of objects within the field of view, and also operates to detect the body position of one or more subjects in the field of view. An example of the depth and position detection device 104 is illustrated and described in more detail with reference to FIGS. 4-5. During use, the depth and position detection device 104 and digital camera 102 are typically arranged near to each other. The depth and position detection device 104 can be synchronized by the digital camera or the controller 108 so that they both capture the respective images at the same time. When synchronized, the body position of the subject is the same or nearly the same in all of the images. In some embodiments, synchronization causes the digital images (and other data) of the digital camera 102 and of the depth and position detection device to be captured within about 10 to about 50 milliseconds of each other milliseconds of each other. Some embodiments capture the images within about 30 and about 35 milliseconds of each other.

In some embodiments, data from the digital camera 102 and the depth and position detection device 104 is supplied to a computing device 106. An example of a computing device is illustrated and described in more detail with reference to FIG. 6.

The computing device 106 can be directly or indirectly connected to the digital camera 102 and depth and position detection device 104 to receive digital data. Direct connections include wired connections through one or more communication cables, and wireless communication using wireless communication devices (e.g., radio, infrared, etc.). Indirect connections include communication through one or more intermediary devices, such as a controller 108, other communication devices, other computing devices, a data communication network, and the like. Indirect connections include any communication link in which data can be communicated from one device to another device.

Some aspects of the present disclosure can be performed by one or more of the digital camera 102, depth and position detection device 104, and the computing device 106, operating independently or in cooperation with the other devices.

Some embodiments further include a controller 108. The controller 108 operates, for example, to synchronize operation of the digital camera 102 and/or the depth and position detection device 104 with the lights 110. Synchronization can alternatively be performed by the computing device 106 in some embodiments.

A handheld control 111 is provided in some embodiments for use by the photographer P. The handheld control 111 can include a capture button, for example, that is pressed by the photographer P to initiate the capture of an image with the digital camera 102 and the detection of depth and position data with the depth and position detection device 104.

Some embodiments further include a data input device, such as a barcode scanner. The barcode scanner can be used to input data into the photography station 100. For example, the subject S can be provided with a card containing a barcode. The barcode is scanned by the data input device to retrieve barcode data. The barcode data includes, or is associated with, subject data that identifies the subject. The barcode data can also include or be associated with additional data, such as order data (e.g., a purchase order for products made from the images), group data (e.g., identifying the subject as being affiliated with a school, church, business, club, sports team, etc.), or other helpful information. The computing device 106 can alternatively, or additionally, operate as the data input device in some embodiments.

Lights 110 include one or more lights that operate to illuminate the subject S and/or the background 112. Some embodiments include foreground light 114 and background light 116. Foreground light 114 can include multiple lights, such as a main light and a fill light. Each of these lights, and the background light 116, can similarly include one or more light sources. Examples of light sources include incandescent bulbs, fluorescent lamps, light-emitting diodes, and discharge lamps.

The foreground light 114 is arranged at least partially forward of the subject S to illuminate the subject. Because the background 112 is typically positioned behind the subject S, the foreground light 114 may also illuminate the background 112.

The background light 116 is arranged and configured to illuminate the background 112. In some embodiments the background light 116 is arranged at least partially forward of the background, to illuminate a forward facing surface of the background. In other embodiments, the background light 116 is arranged at least partially behind the background, to illuminate a translucent background 112 from behind.

The foreground and background lights 114 and 116 are operated independently in some embodiments. For example, in some embodiments a first lighting condition is generated in which the background 112 is illuminated, while a first digital image is captured by the digital camera 102. A second lighting condition is generated in which at least the foreground (e.g., subject S) is illuminated, while a second digital image is captured by the digital camera 102. The first and second digital images can then be processed to separate the foreground object (e.g., subject S) from the background.

Additional exemplary details regarding the generation and timing of such lighting conditions, the process by which a foreground object can be separated from a background, and the replacement of the background with a different background art image are provided in U.S. Pat. No. 7,834,894, titled Method and Apparatus for Background Replacement in Still Photographs, the entire disclosure of which is hereby incorporated by reference.

The background 112 is typically a sheet of one or more materials that is arranged behind the subject S while an image of the subject S is captured. In some embodiments the background 112 is translucent, such that at least some of the light from the background light 116 is allowed to pass through. Typically the background 112 has a monochromatic color. In a preferred embodiment, the background 112 has a color, such as gray, that does not substantially add color to the subject in a digital image. In some embodiments, the background 112 is smooth, such that it has no visible pattern or fabric texture. An example of a suitable material is a rear projection screen material. Other embodiments illuminate the background 112 from the front (but behind the subject S), such that background 112 need not be translucent. An example of a suitable material for the background 112, when front illumination is used, is a front projection screen material.

In other possible embodiments, the photography station 112 does not include background 112. Instead, another object, such as a curtain, wall, room, building, landscape, and the like, functions as the background.

Figure 3:
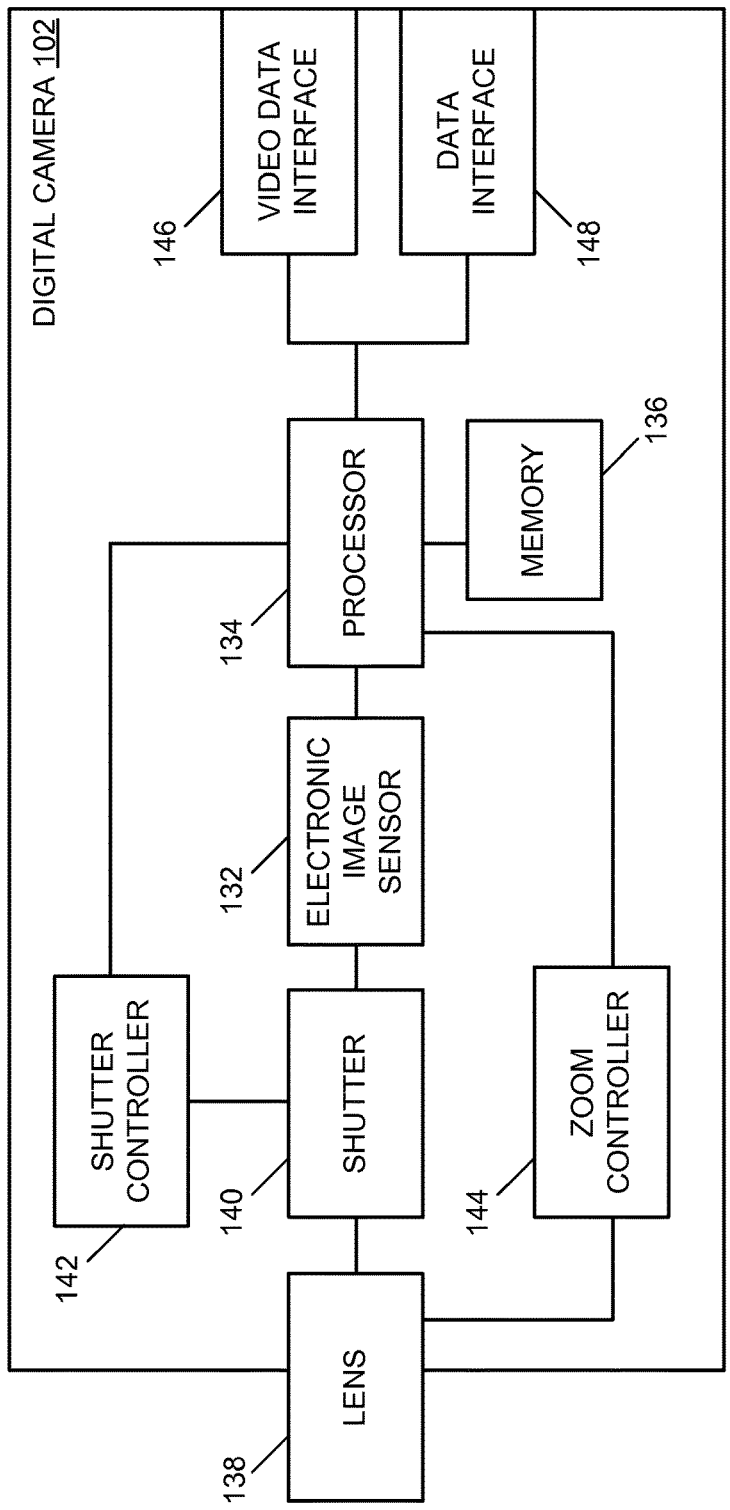
FIG. 3 is a schematic block diagram of an example digital camera of the photography station shown in FIG. 1.

FIG. 3 is a schematic block diagram of an example digital camera 102. Digital camera 102 is typically a professional or high quality digital camera including at least an electronic image sensor 132 for converting an optical image to an electric signal, at least one processing device 134 for controlling the operation of the camera 102, and a memory device 136 for storing the electric signal in the form of digital image data.

An example of the electronic image sensor 132 is a charge-coupled device (CCD). Another example of the electronic image sensor 132 is a complementary metal-oxide-semiconductor (CMOS) active-pixel sensor. The electronic image sensor 132 receives light from a subject and background and converts the received light into electrical signals. The signals are converted into a voltage, which is then sampled, digitized, and stored as digital image data in the memory device 136.

The memory device 136 can include various different forms of computer readable storage devices, such as random access memory. In some embodiments the memory device 136 includes a memory card. A wide variety of memory cards are available for use in various embodiments. Examples include: a CompactFlash (CF) memory card (including type I or type II), a Secure Digital (SD) memory card, a mini Secure Digital (miniSD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, the digital camera 102 includes three main sections: a lens 138, a mechanical shutter 140, and an electronic image sensor 132. Generally, electronic image sensor 132 have relatively rapid exposure speeds. However, the process of moving the captured image from the electronic image sensor 132 to an image storage area such as the memory device 136 is slower than the time to acquire the image. Accordingly, in order to reduce the time between acquiring the backlit and front-lit images as discussed herein—preferably to further reduce any motion of the foreground object in the time period between shots—some embodiments include an electronic image sensor 132 that is an interline transfer CCD. One example of a suitable interline transfer CCD is the model number KAI-11002, available from Eastman Kodak Company Kodak, of Rochester, N.Y. This type of electronic image sensor 132 includes arrays of photodiodes interspaced with arrays of shift registers. In operation, after capturing a first image, photodiodes transfer the electrons to the adjacent shift registers and become ready thereafter to capture the next image. Because of the close proximity between the photodiodes and associated shift registers, the imaging-transfer cycles can be very short. Thus, in some embodiments the digital camera 102 can rapidly capture a first image, transfer the first image to the memory device 136 (where it is temporarily stored) and then capture a second image. After the sequence of images, both of the images can be downloaded to the appropriate longer term memory location, such as a second memory device 136.

Since the electronic image sensor 132 continues to integrate the second image while the first image is read out, a shutter 140 is employed in front of the electronic image sensor 132. In some embodiments, a mechanical shutter 140 is used and is synchronized by the processing device 134. The shutter 140 opens prior to the capture of the first image and remains open for the duration of the second flash. It then receives a signal to close in order to eliminate further exposure from ambient light. Examples of suitable shutters 140 are those that are commercially available and manufactured by Redlake MASD LLC of Tucson, Ariz. However, other shutters 140 may be employed in other embodiments. Further, the exposure may be controlled by the lights 110, shutter 140, and/or a combination of the two in some embodiments.

The lens 138 is located in front of the shutter 140 and is selected to provide the appropriate photographic characteristics of light transmission, depth of focus, etc. In some embodiments, the lens 138 is selected between 50 and 250 mm, with the image taken at an f-stop generally in the range of f16 to f22. This provides a zone focus for the image. It also generally eliminates concerns regarding ambient light. However, it will be appreciated that any number of lenses, focusing, and f-stops may be employed in other embodiments.

To initiate the capture of the images, an image capture button on the handheld control 111 (shown in FIG. 1) is preferably used. In some embodiments the handheld control 111 is connected to the controller 108, which generates a shutter release signal that is communicated to a shutter controller 142 of the digital camera 102. However, other embodiments use other methods and devices to initiate the image capture. For example, a button, switch or other device might be included on the controller 108 or connected to the camera 102. Still further, the computing device 106 is used in some embodiments to initiate the process.

A zoom controller 144 is also provided in some embodiments to mechanically adjust the lens 138 to cause the digital camera 102 to zoom in and out on a subject. In some embodiments the handheld control 111 (shown in FIG. 1) includes zoom in and out buttons. Signals from the handheld control 111 are communicated to the controller 108, which communicates the request to zoom controller 144 of digital camera 102. The zoom controller 144 typically includes a motor that adjusts lens 138 accordingly.

In some embodiments, the digital camera 102 includes a video data interface 146 and a data interface 148. The video data interface 146 communicates live video data from the digital camera 102 to the controller 108 (or computing device 106) in some embodiments. The data interface 148 is a data communication interface that sends and receives digital data to communicate with another device, such as the controller 108 or the computing device 106. For example, in some embodiments the data interface receives image capture messages from the controller 108 that instruct the digital camera 102 to capture one or more digital images. The data interface 148 is also used in some embodiments to transfer captured digital images from the memory device 136 to another device, such as the controller 108 or the computing device 106. Examples of the video data interface 146 and the data interface 148 are USB interfaces. In some embodiments video data interface 146 and data interface 148 are the same, while in other embodiments they are separate interfaces.

Although the camera 102 is described in terms of a digital camera, another possible embodiment utilizes a film camera, which captures photographs on light-sensitive film. The photographs are then converted into a digital form, such as by developing the film and generating a print, which is then scanned to convert the print photograph into a digital image that can be processed in the same way as a digital image captured directly from the digital camera, as described herein.

Figure 4:
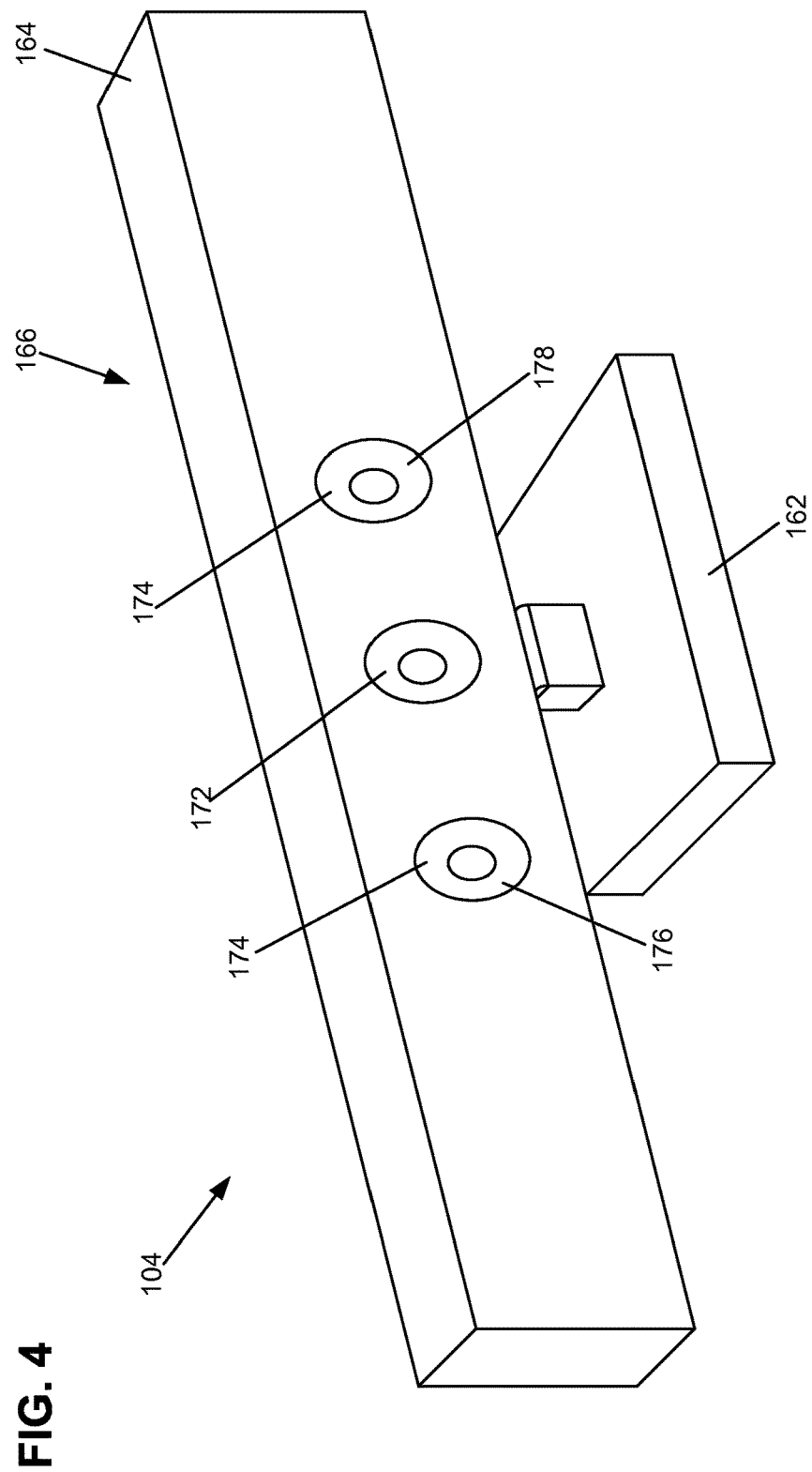
FIG. 4 is a schematic perspective view of an example depth and position detection device of the photography station shown in FIG. 1.
Figure 5:
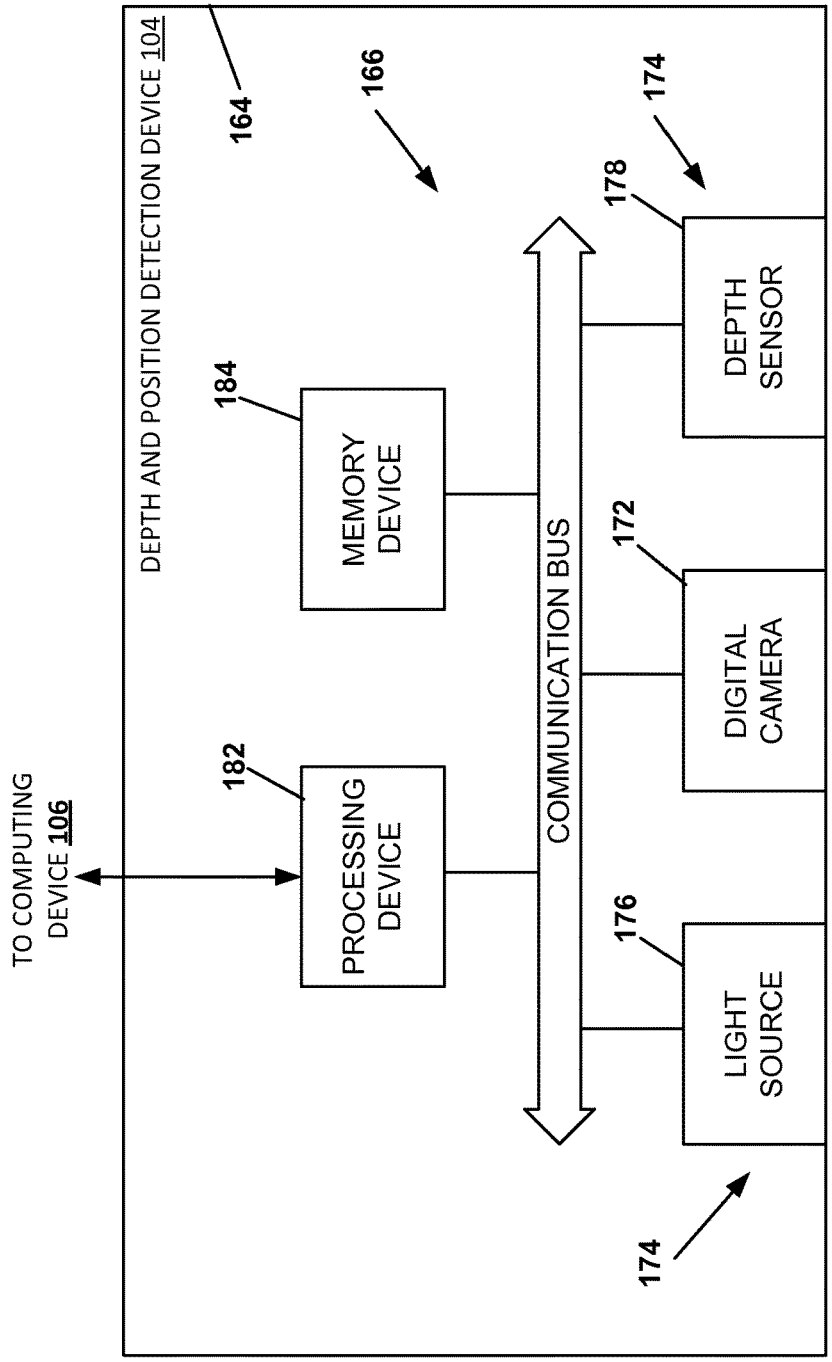
FIG. 5 is a schematic block diagram of the example depth and position detection device shown in FIG. 4.

FIGS. 4-5 illustrate an example of the depth and position detection device 104. FIG. 4 is a schematic perspective view, and FIG. 5 is a schematic block diagram of the example depth and position detection device 104. In this example, the depth and position detection device 104 includes a base 162, a housing 164, and electronic components 166 within the housing 164. The electronic components 166 include a camera 172 and a depth detector 174. In some embodiments, the depth detector includes a light source 176 and a depth sensor 178. As shown in FIG. 5, the electronic components 166 also include a processing device 182 and a memory device 184, in some embodiments.

The base 162 is provided in some embodiments to support the housing 164 and electronic components 166 on another surface. In some embodiments, the base 162 has a substantially flat lower surface configured to be placed on a table or other platform elevated from a floor or ground surface. The lower surface of the base 162 typically includes feet or one or more non-slip layers, to help prevent the depth and position detection device 104 from slipping or falling from the table or other platform.

In another possible embodiment, the base 162 is a tripod, a stool, a chair, or other structure configured to support the housing 164 and electronic components 166 in a spaced and elevated relationship to the floor or ground surface. The base 162 typically includes a pivoting joint through which the base 162 is coupled to the housing 164 to permit the housing 164 to be leveled and the camera 172 and depth detector 174 to be properly directed toward the subject S.

The housing 164 is provided in some embodiments to contain the electronic components 166 therein. The housing 164 is typically formed of injection molded plastic, but other materials are used in other embodiments. Apertures in the housing are formed for the digital camera 172, light source 176, and depth sensor 178. The apertures are typically enclosed with a transparent material, such as glass or plastic.

Although a single housing 164 is illustrated in FIGS. 4-5, such that the depth and position detection device 104 is a single device, in other embodiments the depth and position detection device 104 includes multiple separate devices. For example, the depth and position detection device 104 can include a digital camera 172 having a housing, and a separate depth detector 174 having a separate housing. In this example, the digital camera 172 and the depth detector 174 can be in data communication with each other, or can be separately connected to one or more computing devices, such as computing device 106.

In some embodiments, the electronic components 166 are contained within the housing 164. The electronic components 166 include at least one or more of a digital camera 172 and a depth detector 174. The electronic components 166 also include a processing device 182 and a memory device 184, in some embodiments, and can include additional electronics, such as power supply electronics, filtering electronics, and the like.

The digital camera 172 is typically a device that can capture digital images of a subject, and includes an image detector, such as a CCD element or a CMOS sensor. The digital camera 172 is typically not a professional or high quality digital camera, and as a result the digital camera 172 captures lower resolution and lower quality images than the digital camera 102 described herein. For example, the digital camera 172 typically includes a lower quality lens.

The digital camera 172 also typically has a fixed focal length, and therefore does not include the zoom controller 144, shown in FIG. 3, in some embodiments. In some embodiments, the digital camera 172 does not include calibrated color and exposure control, nor optics (lenses and filters) that are optimized for portraiture.

The depth detector 174 is arranged and configured to evaluate an environment within the field of view of the depth detector 174, and to identify the depth of objects within that environment, including one or more subjects. The depth detector is or includes a type of active scanner that emits radiation or light, and detects the reflection of the radiation or light back from objects within the environment. Examples of active scanners include a time-of flight 3D laser scanner, a triangulation 3D laser scanner, a structured-light 3D scanner, and a modulated light 3D scanner. In another possible embodiment, the depth detector includes a type of passive scanner. An example of a passive scanner is a stereoscopic device, which utilizes two spaced cameras, and analyzes the slight differences between the scenes to determine distances at each point.

In some embodiments, the depth detector includes a light source 176 and a depth sensor 178. The light source 176 generates light, such as a beam or stripe of light, which is controlled to move across the environment, to scan the environment including the subject. Preferably the light source 176 generates light having a wavelength that is not visible to the human eye, such as infrared light (such as in a range from about 1 THz to about 400 THz).

Light from the light source 176 is emitted into the environment, and reflected from objects in the environment. The reflection of the light is detected by the depth sensor 178. Distances can be computed by measuring the amount of time it takes for the reflection to return to the depth sensor 178. Alternatively, the depth sensor 178, being spaced from the light source 176, can use triangulation to compute the distance of a particular point in the environment. The environment can be evaluated on a point-by-point basis or a line-by-line basis to generate a sampling of the distances of points within the environment. The data is aggregated for each point, and stored in memory as depth data.

In some embodiments, the depth and position detection device includes one or more processing devices 182. For simplicity, the one or more processing devices 182 are sometimes referred to herein as a single processing device 182, although the operations can alternatively be performed by multiple processing devices. The same is true for all processing devices described herein.

The processing device 182 controls the operation of the depth and position detection device 104, in some embodiments. The processing device 182 may also perform one or more of the other methods, operations, or functions described herein. The processing device 182 also handles data communication between the depth and position detection device 104, and any external devices, such as the computing device 106. In some embodiments the depth and position detection device 104 further includes one or more communication devices for data communication with other devices. Examples of data communication devices include wired (e.g., Ethernet, USB, Firewire, etc.) or wireless (e.g., Wi-Fi, cellular, Bluetooth, etc.) communication devices.

In some embodiments, the processing device 182 utilizes at least data received from the depth detector 174 to identify the location of one or more subjects S in a digital image. The subject S can be identified by identifying pixels that are closer to the depth and position detection device 104, for example. In some embodiments the depth and position detection device 104 also monitors for movement, where the detected movement can further be used to distinguish subject pixels (that are likely to move) from background pixels (that are likely to remain stationary). For example, the subject can be identified in a depth image (e.g., 306 shown in FIG. 8) by setting a subject flag (such as a subject bit) associated with the pixel to a code representing the subject (e.g., "1"), while non-subject pixels have a code representing a non-subject pixel (e.g., "0"). Further, in some embodiments multiple subjects can be uniquely identified, and each subject is given a separate code. For example, three bits can be used, where binary "000" represents a non-subject pixel, "001" represents a first subject, "010" represents a third subject, etc. This information can alternatively be stored in the digital image (e.g., 302, shown in FIG. 8) generated by the digital camera 172.

In some embodiments, the processing device 182 identifies body point positions of one or more subjects S. For example, the processing device 182 utilizes the depth data to identify the subject portion of the data, which represents the subject. The subject portion is then evaluated to identify body points, such as the head, torso, arms, legs, and feet, as well as joints, such as elbows, hips, and knees. This body point position data is stored in the memory device 184.

The memory device 184 operates to store digital data. In some embodiments, the memory device 184 stores images captured by the digital camera 172 and depth data collected by the depth detector 174. The body point position data can also be stored in the memory device 184. The memory device 184 is typically a type of computer readable storage device, such as one or more of those described herein.

Other suitable examples of devices that can operate as part or all of the depth and position detection device 104 include the KINECT™ device for the XBOX® video game system, the PS1080 System on Chip from PrimeSense, Ltd., the Nite MiddleWare, also from PrimeSense, LTD, the Xtion PRO (e.g., Part No. 90IW0112-B01UA) depth sensor or the RGB & depth sensor provided by ASUS®. Additional information and downloadable software modules are also available from the OpenNI® (currently available at openni.org).

Figure 6:
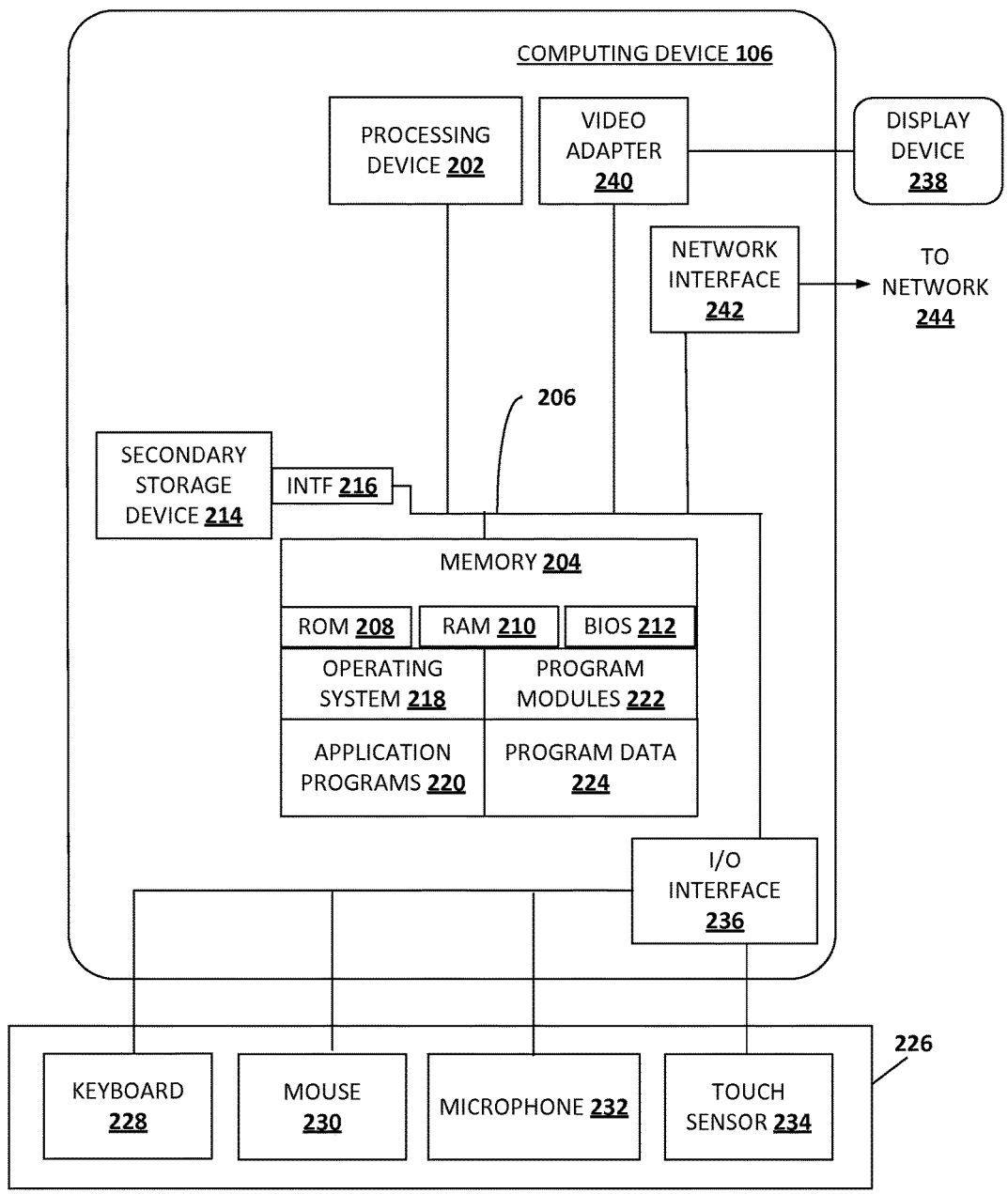
FIG. 6 illustrates an exemplary architecture of a computing device of the photography station shown in FIG. 1.

FIG. 6 illustrates an exemplary architecture of a computing device that can be used to implement aspects of the present disclosure, including a computing device 106 of the photography station 100. The computing device is also an example of computing devices that can perform subsequent processing, such as may be located in a lab facility that performs subsequent processing on digital images, or used in the final production of photographic products. The computing device is also an example of a web server that can be used to distribute photographic products to customers in a digital form, or to take orders for photographic products.

The computing device illustrated in FIG. 6 is operable to execute one or more of the operating system, application programs, and software modules (including the software engines shown in FIG. 11) described herein. By way of example, the computing device will be described below as the computing device 106. To avoid undue repetition, this description of the computing device will not be separately repeated herein for each of the other computing devices described herein, but such devices can also be configured as illustrated and described with reference to FIG. 6.

The computing device 106 includes, in some embodiments, at least one processing device 202, such as a central processing unit (CPU). A variety of processing devices are available from a variety of manufacturers, for example, Intel or Advanced Micro Devices. In this example, the computing device 106 also includes a system memory 204, and a system bus 206 that couples various system components including the system memory 204 to the processing device 202. The system bus 206 is one of any number of types of bus structures including a memory bus, or memory controller; a peripheral bus; and a local bus using any of a variety of bus architectures.

Examples of computing devices suitable for the computing device 106 include a desktop computer, a laptop computer, a tablet computer, a mobile computing device (such as a smart phone, an iPod® or iPad® mobile digital device, or other mobile devices), or other devices configured to process digital instructions.

The system memory 204 includes read only memory 208 and random access memory 210. A basic input/output system 212 containing the basic routines that act to transfer information within computing device 106, such as during start up, is typically stored in the read only memory 208.

The computing device 106 also includes a secondary storage device 214 in some embodiments, such as a hard disk drive, for storing digital data. The secondary storage device 214 is connected to the system bus 206 by a secondary storage interface 216. The secondary storage devices 214 and their associated computer readable media provide nonvolatile storage of computer readable instructions (including application programs and program modules), data structures, and other data for the computing device 106.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 214 or memory 204, including an operating system 218, one or more application programs 220, other program modules 222 (such as the software engines described herein), and program data 224. The computing device 106 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 106 through one or more input devices 226. Examples of input devices 226 include a keyboard 228, mouse 230, microphone 232, and touch sensor 234 (such as a touchpad or touch sensitive display). Other embodiments include other input devices 226. The input devices are often connected to the processing device 202 through an input/output interface 236 that is coupled to the system bus 206. These input devices 226 can be connected by any number of input/output interfaces, such as a parallel port, serial port, game port, or a universal serial bus. Wireless communication between input devices and the interface 236 is possible as well, and includes infrared, BLUETOOTH® wireless technology, 802.11 a/b/g/n, cellular, or other radio frequency communication systems in some possible embodiments.

In this example embodiment, a display device 238, such as a monitor, liquid crystal display device, projector, or touch sensitive display device, is also connected to the system bus 206 via an interface, such as a video adapter 240. In addition to the display device 238, the computing device 106 can include various other peripheral devices (not shown), such as speakers or a printer.

When used in a local area networking environment or a wide area networking environment (such as the Internet), the computing device 106 is typically connected to the network 244 through a network interface, such as an Ethernet interface 242. Other possible embodiments use other communication devices. For example, some embodiments of the computing device 106 include a modem for communicating across the network.

The computing device 106 typically includes at least some form of computer readable media. Computer readable media includes any available media that can be accessed by the computing device 106. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 106.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

Figure 7:
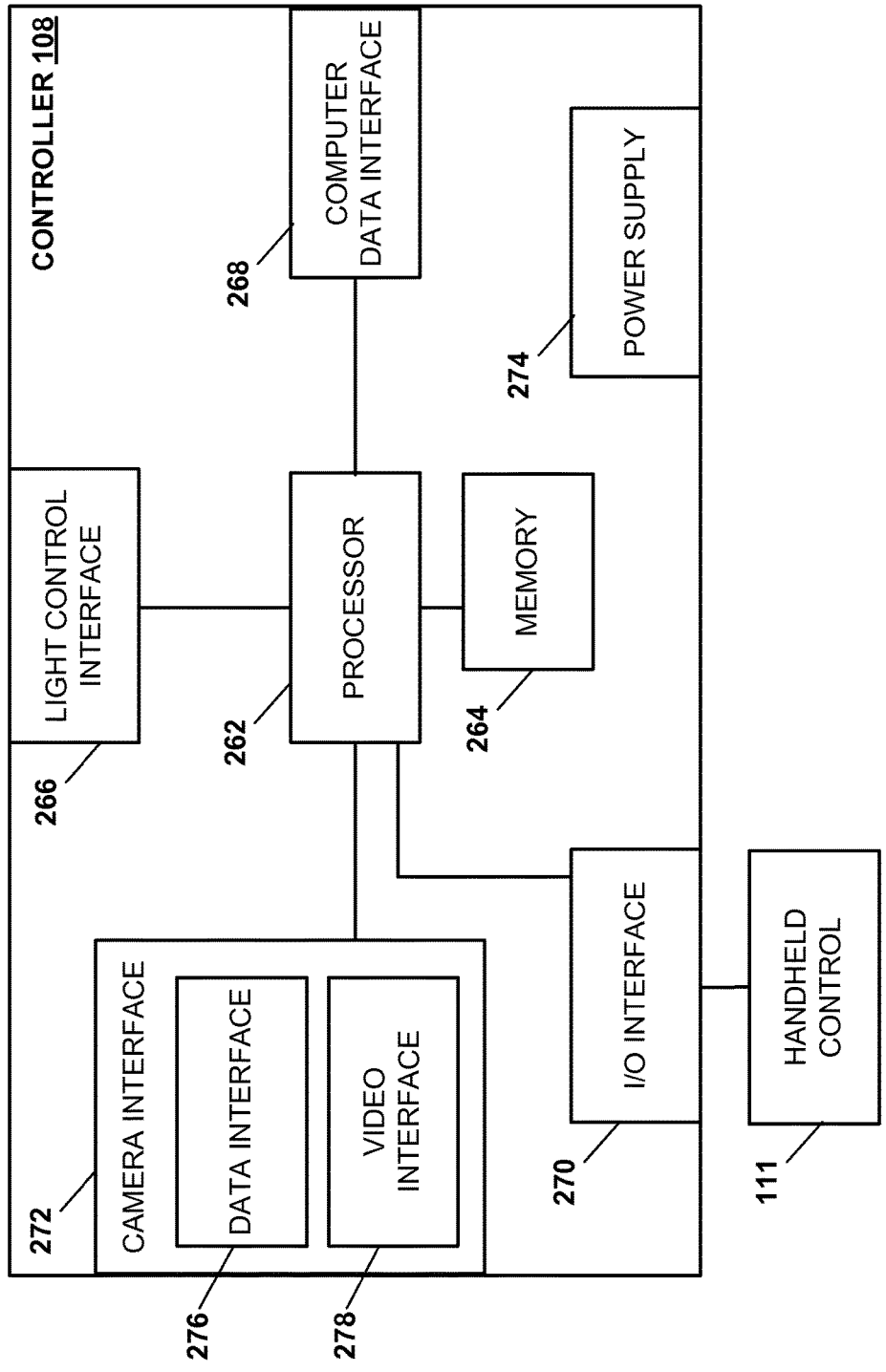
FIG. 7 is a schematic block diagram of an example controller of the photography station shown in FIG. 1.

FIG. 7 is a schematic block diagram of an example controller 108. In this example, controller 108 includes a processing device 262, a memory device 264, light control interface 266, computer data interface 268, input/output interface 270, camera interface 272, and power supply 274. In some embodiments, camera interface 272 includes a data interface 276 and a video interface 278.

The processing device 262 performs control operations of controller 108, and interfaces with the memory device 264. Examples of suitable processors and memory are described herein.

Light control interface 266 allows controller 108 to control the operation of one or more lights, such as the foreground lights 114 and background lights 126 (shown in FIG. 1). In some embodiments light control interface 266 is a send only interface that does not receive return communications from the lights. Other embodiments permit bidirectional communication. Light control interface 266 is operable to selectively illuminate one or more lights at a given time. Controller 108 operates to synchronize the illumination of the lights with the operation of camera 102.

Computer data interface 268 allows controller 108 to send and receive digital data with computing device 106. An example of computer data interface 268 is a universal serial bus interface, although other communication interfaces are used in other embodiments, such as a wireless or serial bus interface.

One or more input devices, such as handheld control 111, are coupled the processing device 262 through input/output interface 270. The input devices can be connected by any number of input/output interfaces 270 in various embodiments, such as a parallel port, serial port, game port, universal serial bus, or wireless interface.

Camera interface 272 allows controller 108 to communicate with camera 102. In some embodiments, camera interface 272 includes a data interface 276 that communicates with data interface 148 of camera 102 (shown in FIG. 4), and a video interface 278 that communicates with video data interface 146 of camera 102 (also shown in FIG. 4). Examples of such interfaces include universal serial bus interfaces. Other embodiments include other interfaces.

In some embodiments a power supply 274 is provided to receive power, such as through a power cord, and to distribute the power to other components of the photography station 100, such as through one or more additional power cords. Other embodiments include one or more batteries. Further, in some embodiments controller 108 receives power from another device.

In some embodiments, controller 108 is arranged and configured to provide a single trigger pulse at the start of the integration of the first image. This pulse may be used by the controller 108 to synchronize the lights 110. In one embodiment, the front or rising edge is used to trigger the background light 116, while the trailing or falling edge can trigger the foreground light 114. Other types of triggers and pulses may be used. For example, controller 108 uses two different pulses in some embodiments, etc. Yet other embodiments communicate digital messages that are used to synchronize and control the various operations.

Figure 8:
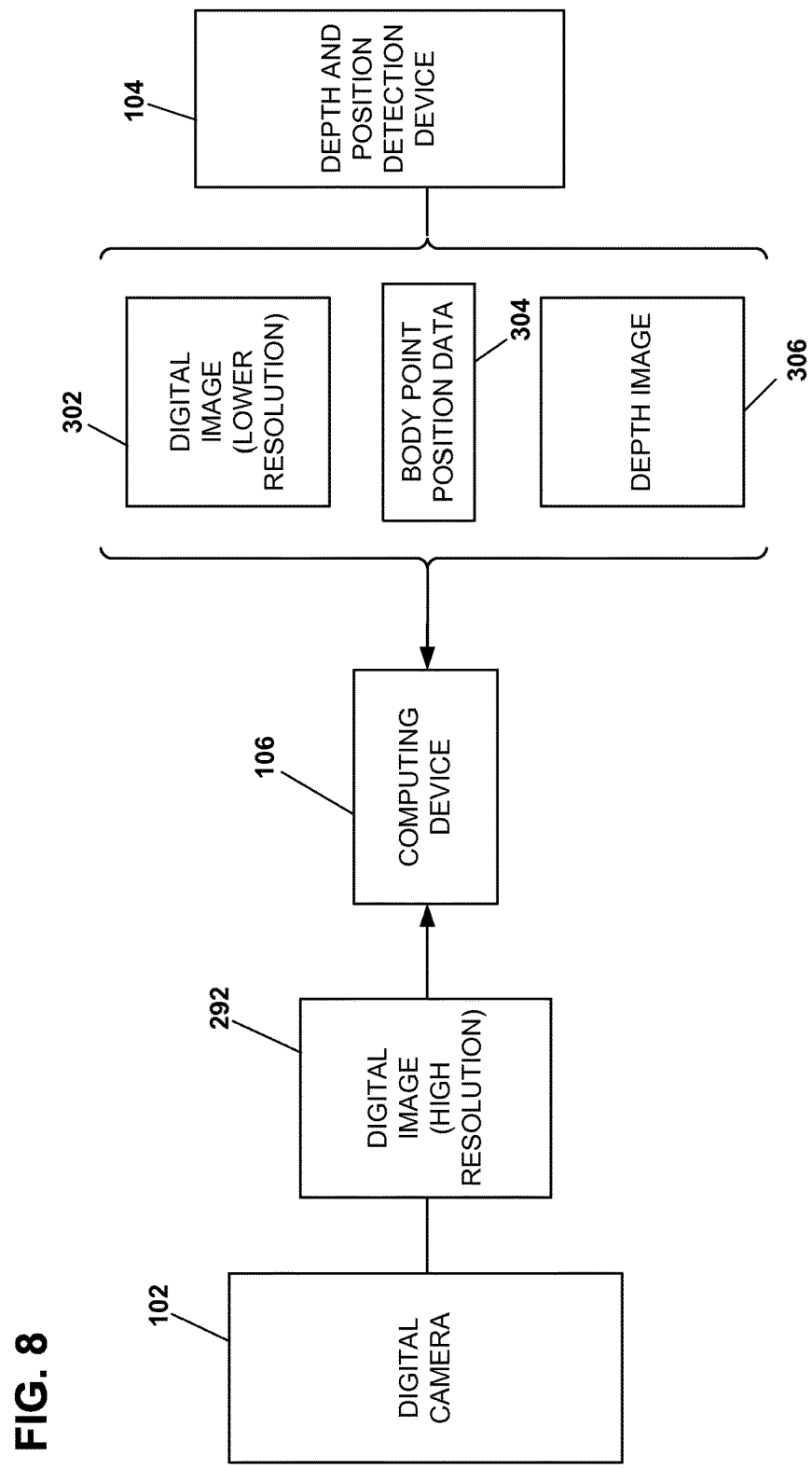
FIG. 8 is a schematic block diagram illustrating selected data communication between components of the photography station shown in FIG. 1.

FIG. 8 is a schematic block diagram illustrating some of the data communication between components of the photography station 100. The illustrated components of the photography station include the digital camera 102, the depth and position detection device 104, and the computing device 106.

The digital camera 102 and the depth and position detection device 104 both supply data for further processing to the computing device 106, in some embodiments.

The data from the digital camera 102 includes a high resolution image 292 of the subject S, captured by the digital camera. The digital image 292 is typically encoded as digital data according to a digital image file format. An example of a digital image file format is the joint photographic experts group (JPEG) digital image format, such as using Red-Green-Blue (RGB) encoding. Other embodiments use other formats, such as exchangeable image file format (EXIF), tagged image file format (TIFF), raw image format (RAW), portable network graphics (PNG) format, graphics interchange format (GIF), bitmap file format (BMP), portable bitmap (PBM) format, or other digital file formats.

In some embodiments, the digital image 292 includes pixels that define both the subject S (the subject portion) and the background 112 (the background portion). In other embodiments, the digital image includes only the subject portion, and the background portion is removed using background replacement techniques described in U.S. Pat. No. 7,834,894, titled Method and Apparatus for Background Replacement in Still Photographs. In yet another possible embodiment, the digital camera 102 provides multiple images, including a background illuminated image (in which the subject S is dark) and a foreground illuminated image (in which at least the subject S is illuminated). The multiple images can be subsequently processed to separate the subject portion from the background portion, if desired, and to replace the background with a different background art image.

In some embodiments, the digital image 292 includes metadata that provides additional information about the subject (e.g., name, identification number, age, class, group affiliations, etc.), the photography session, order information, or other desired information.

Additional data is received from the depth and position detection device 104. In some embodiments, the data includes one or more of a digital image 302, body point position data 304, and a depth image 306.

The digital image 302 is an image of the subject S captured by the depth and position detection device 104. Because the digital camera of the depth and position detection device 104 is typically lower quality and lower resolution than the digital camera 102, the digital image 302 is also typically of lower quality and resolution than the digital image 292. The digital image 302 can be encoded in a variety of digital image formats, such as those described herein.

The body point and position data 304 includes data that identifies the locations of subject body points 324 within the digital image 302. In some embodiments, the body points 324 are identified by coordinates, such as having an x-coordinate, a y-coordinate, and a z-coordinate that identify the positions of each body point 324. The origin (0,0,0) can be defined wherever convenient, such as at the location of the digital camera 172, or the location of the depth sensor 178. In another possible embodiment, the origin is defined at a location two meters in front of the depth and position detection device 104. In this example, the x-dimension extends left and right in the digital image 302, the y-dimension extends up and down, and the z-dimension extends into and out of the digital image 302. The coordinates identify a distance from an origin, such as from the upper left pixel of the digital image 302. For example, a point associated with the subject's right elbow might have the coordinate (198, 362), indicating that the elbow is located 198 pixels to the right of the upper left pixel of the digital image 302, and 362 pixels down from the upper left pixel. An example of the body point position data 304 is visually depicted in FIG. 9 on an example of the digital image 302.

The depth image 306 is generated by the depth and position detection device 104 utilizing the depth detector 174. The depth image 306 stores data representative of the distances of points within the image 302. Examples of the depth image 306 are illustrated and described in more detail with reference to FIGS. 10-12.

Figure 9:
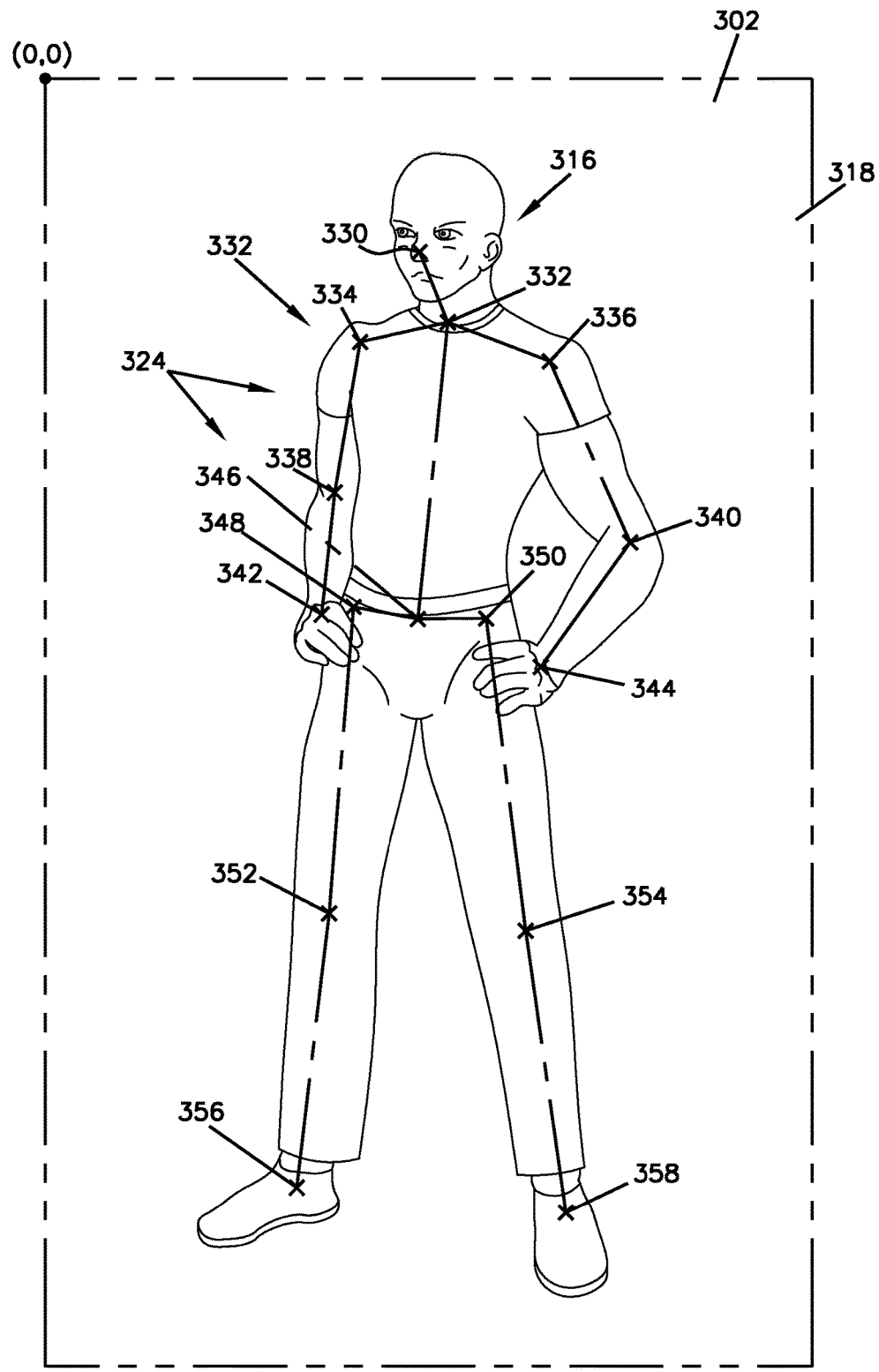
FIG. 9 illustrates a digital image including a skeletal model of a subject.

FIG. 9 illustrates the digital image 302 including a skeletal model 322 of the subject S generated from the body point position data 304. The digital image 302 includes a subject portion 316 and a background portion 318. The skeletal model 322 is formed of the body points 324 identified in the body point position data 304.

In this example, the body points 324 include a head point 330, a top of spine point 332, right and left shoulder points 334 and 336, right and left elbow points 338 and 340, right and left hand points 342 and 344, a bottom of spine point 346, right and left hip points 348 and 350, right and left knee points 352 and 354, and right and left feet points 356 and 358. Some embodiments include additional, fewer, or different body points. For example, some embodiments include left and right wrist points and left and right ankle points.

A skeletal model 322 can be formed and visualized by lines extending between the body points 324, as illustrated in FIG. 9, which provides rough approximations of the skeletal portions of subject S.

Figure 10:
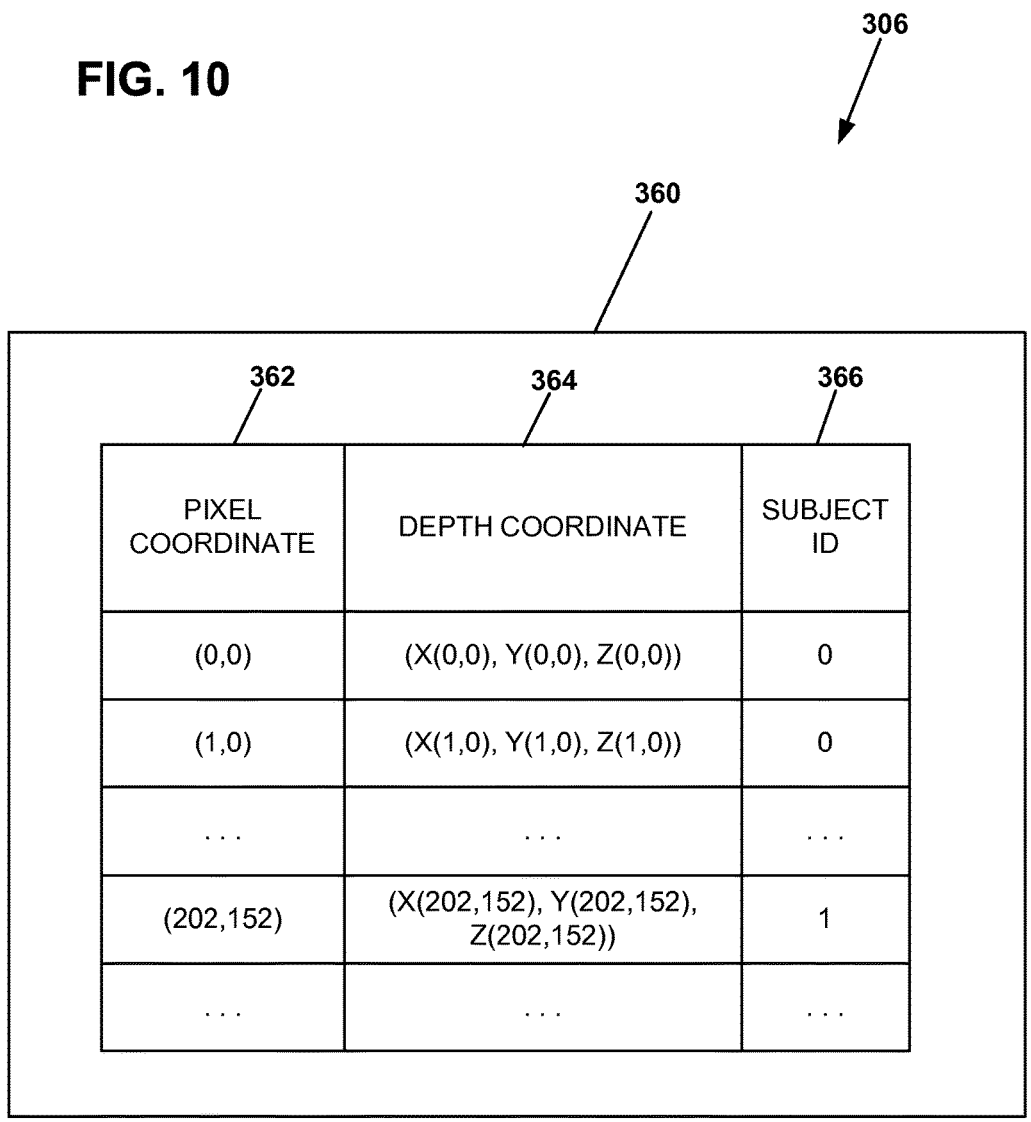
FIG. 10 illustrates an example of data of a depth image.
Figure 11:
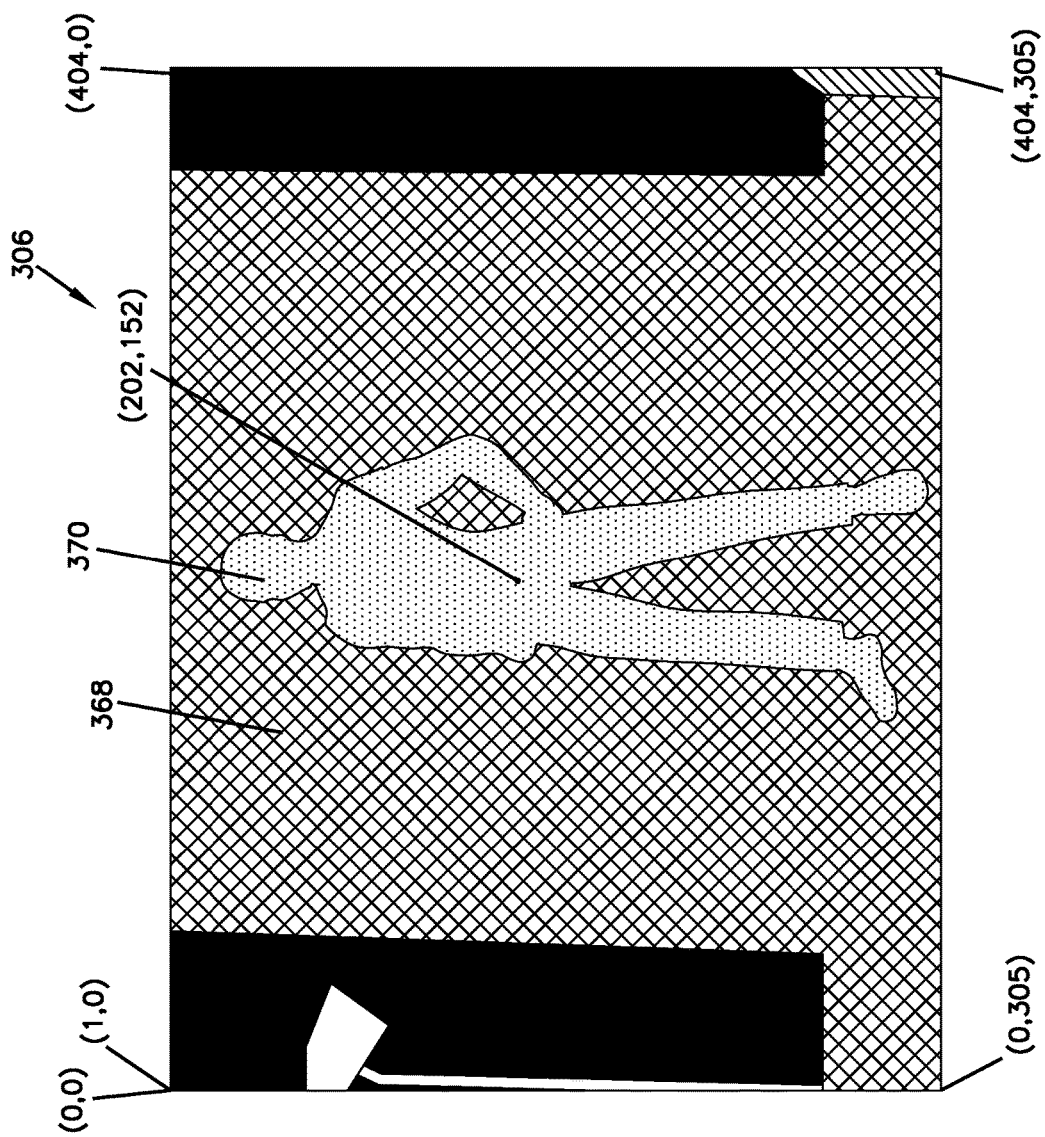
FIG. 11 illustrates the depth image in an exemplary graphical representation.
Figure 12:
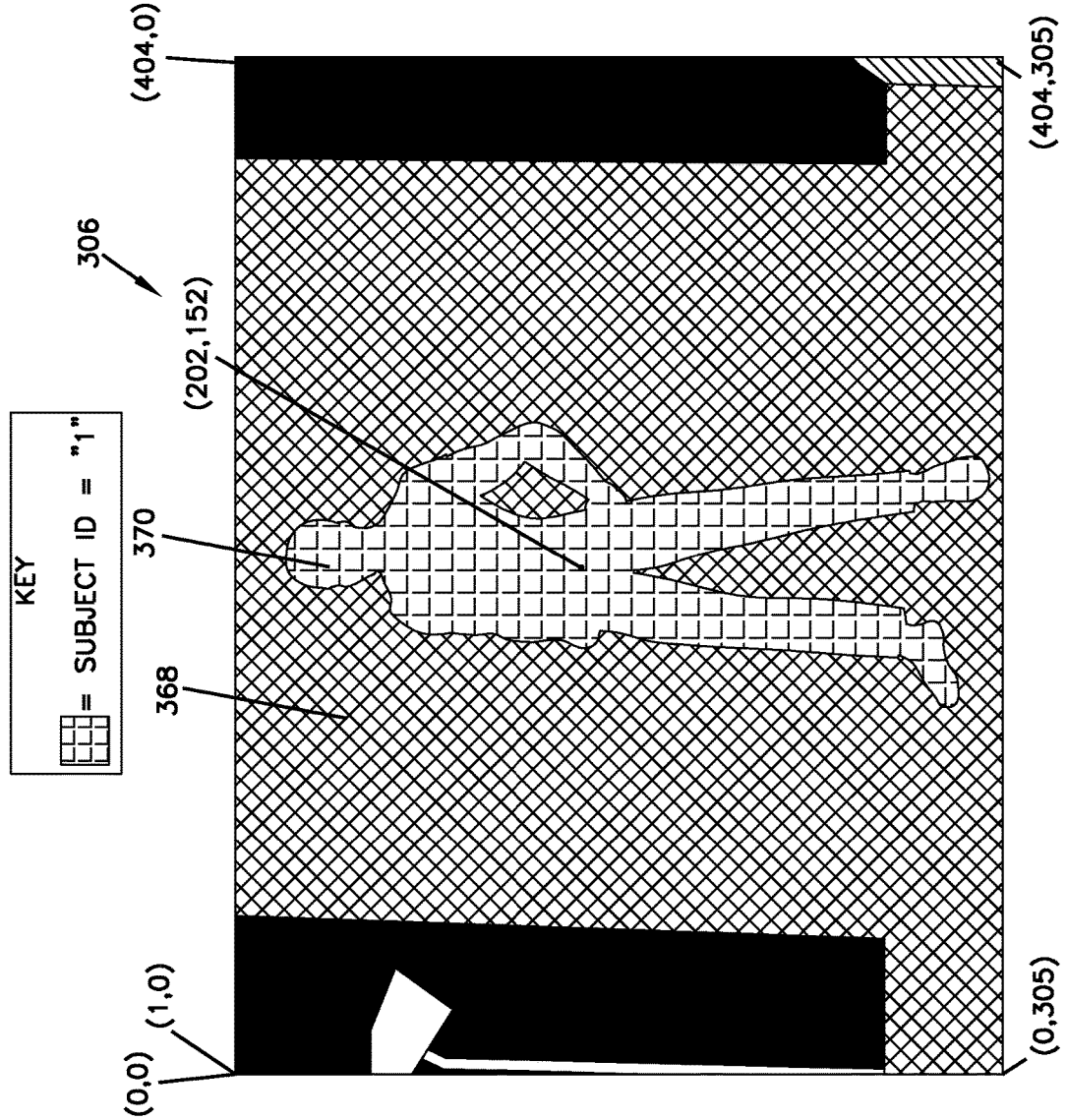
FIG. 12 illustrates the depth image in another exemplary graphical representation.

FIGS. 10-12 illustrate examples of the depth image 306. FIG. 10 is a schematic diagram of the depth image data 360 that can be represented as the depth image 306. FIG. 11 is an example of the depth image 306, which is a graphical representation of the depth image data 360. FIG. 12 is another example of the depth image 306, with another graphical representation of the depth image data 360.

Referring back to FIG. 8, the depth image 306 is generated by the depth and position detection device 104 and is at least temporarily stored in a computer readable storage device, such as the memory device 184 (shown in FIG. 5). In some embodiments, the depth and position detection device 104 then transfers the depth image 306 to the computing device 106, where it is again stored in a computer readable storage device, such as the memory 204 or the secondary storage device 214 (FIG. 6).

FIG. 10 illustrates an example of the data 360 that makes up the depth image 306. In this example, the depth image data 360 includes pixel coordinates 362, depth coordinates 364, and a subject identifier 366.

The pixel coordinates 362 are the coordinates for each pixel that makes up the depth image. The pixel coordinates 362 include X values and Y values, which are integers between 0 and the maximum coordinates. In one example, the depth image is 405 pixels wide (such that the maximum X value is X−1=404) and 305 pixels high (such that the maximum Y value is Y−1=304). The origin can be defined as the upper left corner of the depth image 306, which has a pixel coordinate of (0,0), as shown in FIGS. 10-11.

For each pixel coordinate 362, there is a corresponding depth coordinate 364. The depth coordinate 364 defines the three-dimensional location of the nearest object that was detected by the depth detector 174 for the corresponding pixel coordinate 362. In some embodiments, the depth coordinate 364 is defined by a three-dimensional space having an origin forward of the depth and position detection device 104. For example, the origin (0,0,0) can be defined as the point that is 2 meters forward of the depth and position detection device 104. The depth coordinates 364 are then computed as three-dimensional distances (expressed in X-, Y-, and Z-coordinates) from the origin, such as in millimeters from the origin.

The subject identifier 366 indicates whether a subject has been identified at the location of the pixel coordinate 362, and if so, which subject. In some embodiments, a "0" indicates that no subject has been identified at the pixel coordinate 362. A non-zero number represents a unique identifier for a given subject that has been identified at the pixel coordinate 362. For example, a center pixel at pixel coordinate (202, 152) has a subject ID 366 of "1" indicating that a first subject has been identified at that pixel coordinate 362. If additional subjects are found, the additional subjects can be assigned consecutive subject identifiers (e.g., 2, 3, 4, etc.). In some embodiments the subject identifiers are expressed in binary.

FIG. 11 illustrates the depth image in an exemplary graphical representation. In this graphical representation, each pixel has a color that represents a range of distances away from the depth and position detection device 104.

For example, the pixel at pixel coordinate 362 (0,0) has a first color (e.g., black). In this example, the first color represents a depth coordinate that is greater than a maximum distances away from the depth and position detection device 104 (e.g., greater than 10 meters away). The depth coordinate 364 for the next pixel coordinate 362 (1,0) has approximately the same distance, and so it is also displayed in the first color.

In this example, a background material (shown in background portion 368) is arranged behind the subject (shown in subject portion 370). The background portion 368 is displayed in the depth image 306 in a second color (e.g., dark gray) that is lighter than the first color, to indicate that the background is closer to the depth and position detection device 104 than those shown in the first color.

The subject is closer to the depth and position detection device 104, and therefore the subject portion 370 pixels are displayed in a third color (e.g., lighter gray), which is lighter than the second color. For example, the center pixel (202, 152) is displayed in the third color.

FIG. 12 illustrates another example of the depth image 306 displayed with a different graphical representation. This graphical representation of the depth image 306 is the same as that illustrated in FIG. 11, except that the pixels having a subject ID of "1" are displayed with a unique fill pattern to visually distinguish subject portion 370 pixels from other pixels in the depth image 306. In this example, subject portion 370 pixels (such as including the center pixel at pixel coordinate (202, 152)) are displayed in a black and white checkered pattern. The same or other patterns can be used for displaying other subjects. The subject portion 370 can be graphically represented in other ways in other embodiments to visually distinguish the subject pixels from other pixels.

Figure 13:
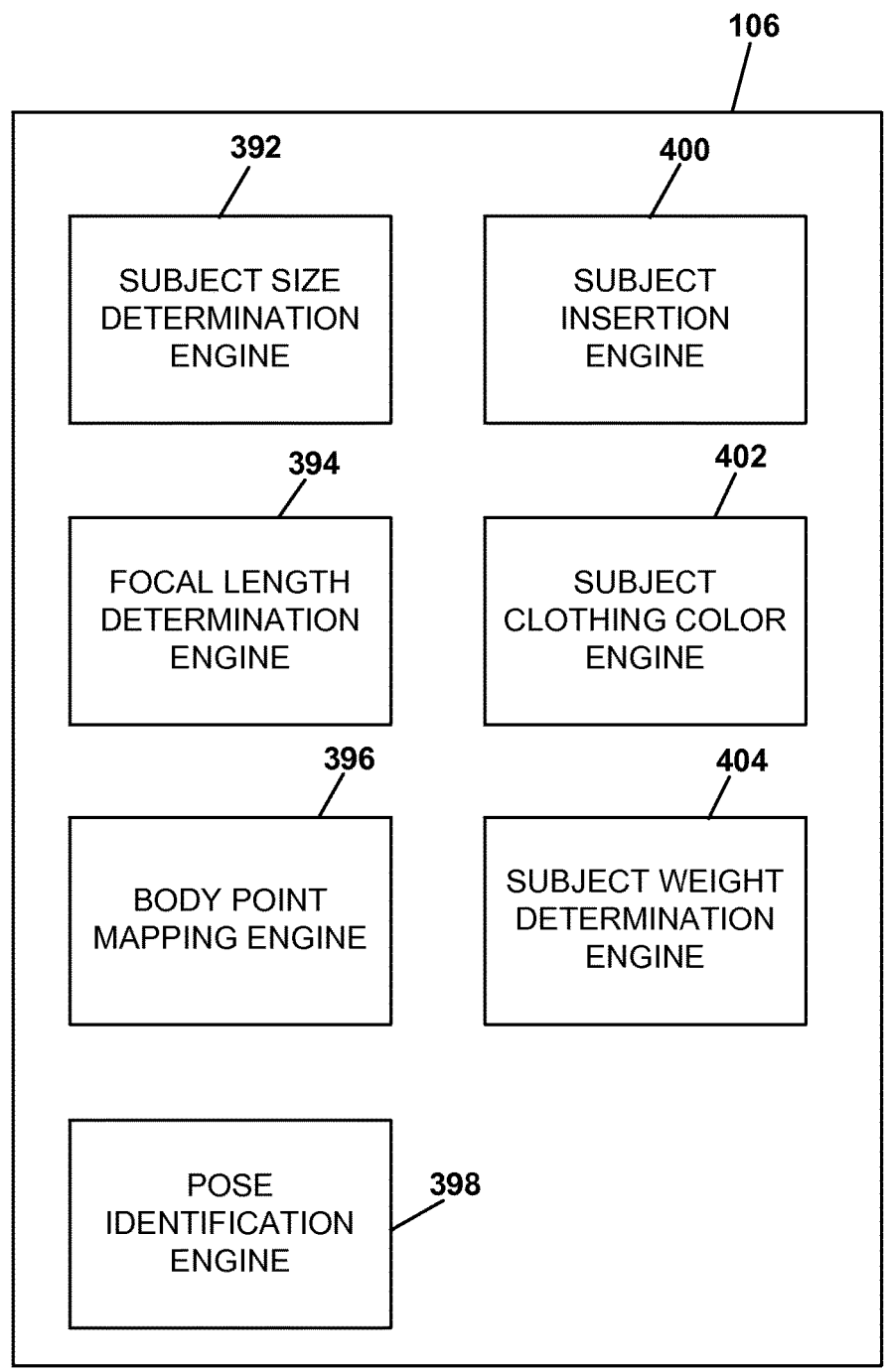
FIG. 13 is a schematic block diagram illustrating various exemplary engines of the computing device shown in FIG. 6.

FIG. 13 is a schematic block diagram illustrating various exemplary engines of the computing device 106, shown in FIG. 6. More specifically, the example computing device 106 includes a subject size determination engine 392, a focal length determination engine 394, a body point mapping engine 396, a pose identification engine 398, and a subject insertion engine 400. The computing device 106 can include any one or more of the engines shown in FIG. 13, or different engines, in other embodiments.

The subject size determination engine 392 determines an estimate of the actual physical size of the subject S. For example, if the subject is standing the subject size determination engine 392 can compute the actual physical height of the subject as 5'5" tall. If the subject is seated, the actual physical size of the subject S when seated is computed. This subject size data is then stored in memory and associated with the digital image 292. The subject size data can be used for various purposes, such as for scaling the digital image 292 with other digital images to appropriate relative proportions. Additional details of the subject size determination engine 392 are illustrated and described with reference to FIGS. 14-15.

The focal length determination engine 394 determines the focal length of digital camera 102 (shown in FIG. 8) that was used to capture the digital image 292. In some embodiments, the digital camera 102 has a lens 138 with a variable focal length, which is controlled by the zoom controller 144. In contrast, the depth and position detection device 104 typically has a fixed focal length. As a result, the relative size of the subject S in the digital image 292 taken by the digital camera 102 may be larger or smaller than the size of the subject S in digital image 302 taken by the depth and position detection device 104. The focal length determination engine 394 permits the photography station to automatically determine the focal length of the digital camera 102 at the time that the digital image 292 was taken. An example of the focal length determination engine 394 is illustrated and described in more detail with reference to FIGS. 16-17.

The body point mapping engine 396 identifies body point positions of the subject S within the digital image 292. In some embodiments, the body point mapping engine 396 utilizes the focal length from the focal length determination engine 394, as well as the body point position data 304 from the depth and position detection device 104 (shown in FIG. 8). Using this data, the body point mapping engine 396 maps the body points identified in the digital image 302 with the same body points in the digital image 292. An example of the body point mapping engine 396 is illustrated and described in more detail with reference to FIGS. 18-19.

The pose identification engine 398 evaluates the body point positions in a digital image (302 or 292) to identify the subject's pose. In some embodiments, the pose is selected from a set of predetermined poses, such as one or more of: sitting, kneeling, lying down, standing, arms crossed, arms uncrossed, right arm bent at elbow, left arm bent at elbow, facing straight, turned toward right, and turned toward left, or combinations thereof. The pose is then stored and associated with the digital image 292 for subsequent use. An example of the pose identification engine 398 is illustrated and described in more detail with reference to FIGS. 20-21.

The subject insertion engine 400 operates to insert a subject portion of the digital image 292 into another scene or image. For example, the subject insertion engine 400 utilizes background replacement techniques, in some embodiments, to identify the subject portion of the digital image 292 and to replace the background portion of the digital image 292 with another background art file. In some embodiments, templates are defined that include a background art file, a predetermined subject pose, and one or more predetermined body point positions. The subject insertion engine 400 inserts the subject portion of the digital image 292 into the background art file using the template. In some embodiments multiple subjects are combined into a single digital image to generate a group composite image. An example of the subject insertion engine 400 is illustrated and described in more detail with reference to FIGS. 22-25.

The subject clothing color engine 402 operates to evaluate the subject portion(s) of the digital image 292 or 302 to determine the color or colors of the subject's clothing. Knowing the subject's clothing color allows the subject to be inserted into a scene having complementary colors, for example, or to apply a border having complementary colors, as another example. An example of the subject clothing color engine 402 is illustrated and described in more detail with reference to FIGS. 26-27.

The subject weight determination engine 404 operates to estimate the weight of a subject. Knowing an estimate of the subject's weight can be helpful, for example, to select poses or scenes that are complementary to the subject's weight.

Figure 14:
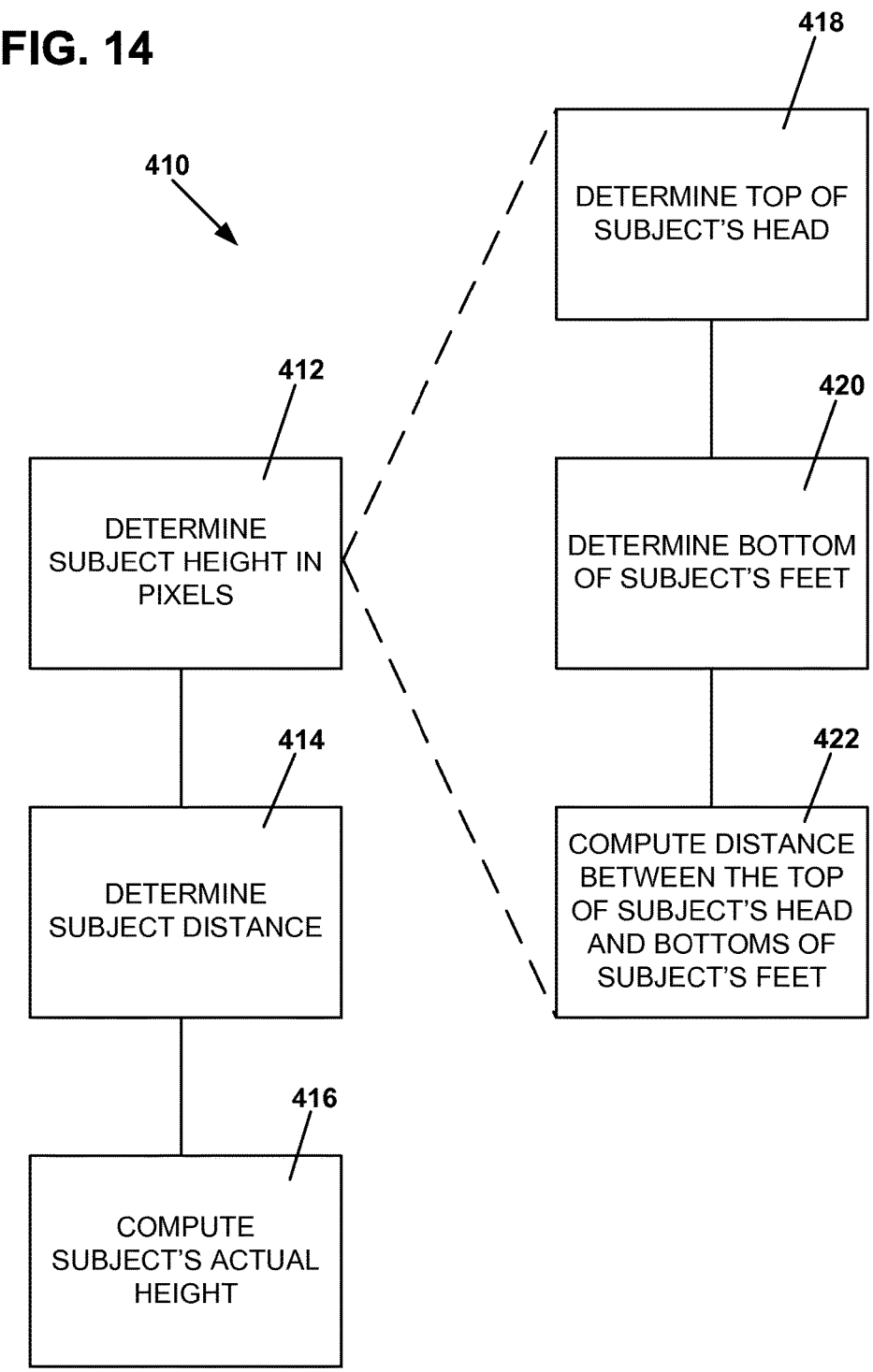
FIG. 14 is a flow chart illustrating a method of determining a subject's physical size.
Figure 15:
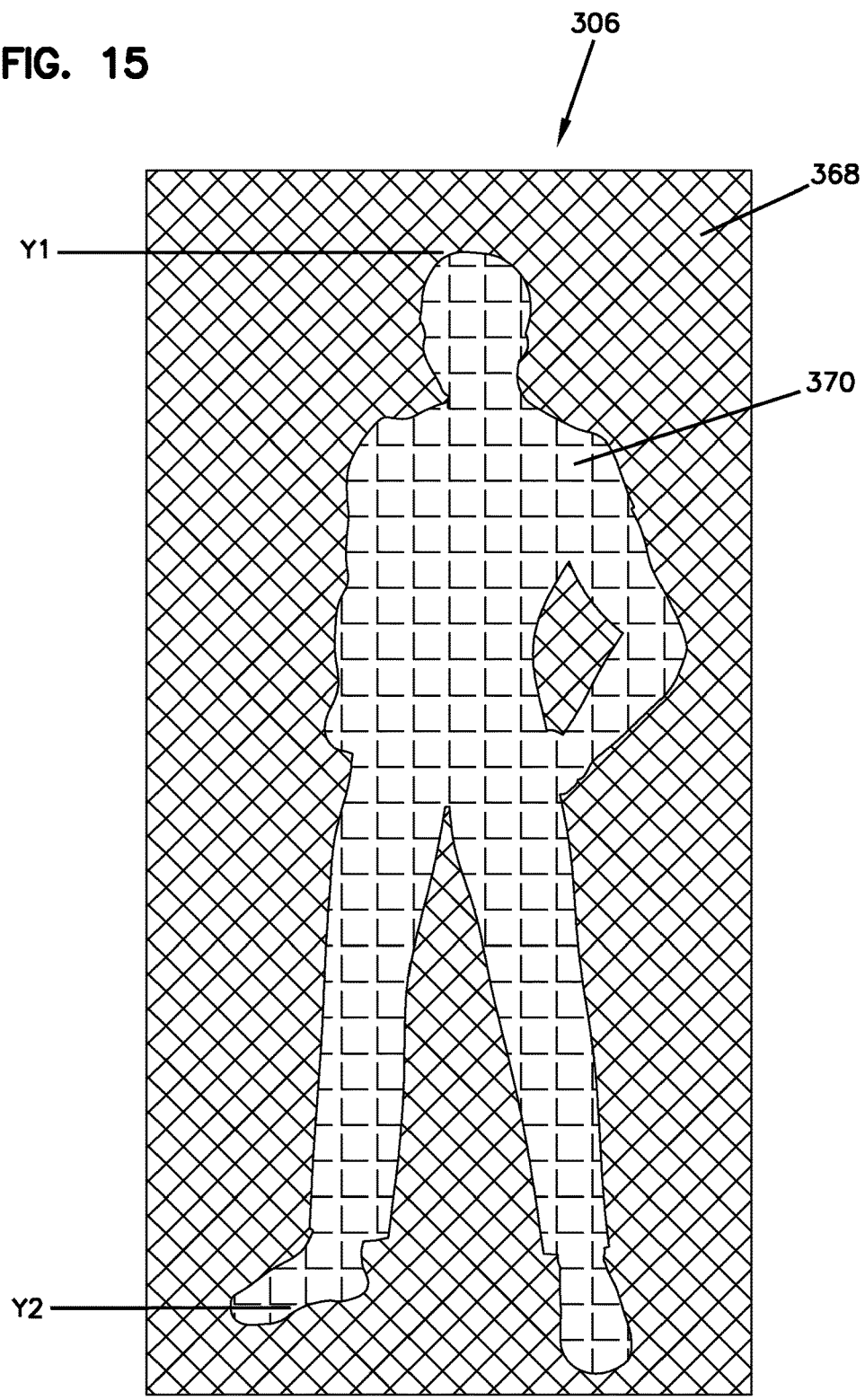
FIG. 15 illustrates a depth image generated by the depth and position device and utilized in the method shown in FIG. 14.

FIGS. 14-15 illustrate an example of the subject size determination engine 392, shown in FIG. 11. FIG. 14 is a flow chart illustrating a method 410 of determining a subject's physical size. FIG. 15 illustrates the operations of the method 410 utilizing the depth image 306 from the depth and position detection device 104.

In the example shown in FIG. 14, the method 410 includes operations 412 and 414. In some embodiments, method 410 includes operations 412, 414, and 416. An example of operation 412 further includes operations 418, 420, and 422.

Operation 412 is performed to determine the height of the subject in pixels in an image. The digital image can be any one of digital images 292 or 302, or the depth image 306 (shown in FIG. 8). An advantage of using the depth image 306 is that the subject portion 370 of the depth image 306 (shown in FIG. 15) can be easily distinguished from the background portion 368.

In another possible embodiment, a background illuminated image can be used, in which the foreground (subject) is dark and the background is light. The background illuminated image includes a similar contrast so that the subject and background can be easily distinguished from each other. Other techniques (such as green/blue screen technology or other data processing techniques) can also be used to determine the subject height.

In one specific example, the depth image 306 is used, as shown in FIG. 15. The depth image 306 includes a subject portion 370 and a background portion 368. The background portion 368 is much darker than the subject portion 370, indicating that the subject is closer to the depth and position detection device 104 than the background.

Operation 418 evaluates the depth image 306 to identify the top of the subject's head. In some embodiments, the depth image 306 is scanned beginning with the top row of pixels and proceeding downward. Each row of pixels is evaluated to determine whether the pixels contained therein are part of the background portion 368 or part of the subject portion 370.

In some embodiments, the first row is taken to be entirely part of the background portion 368, such that subsequent rows can be compared with the color of these pixels.

Each row is then evaluated until subject pixels are identified in the row (e.g., row Y1). In some embodiments, if any subject pixels are identified, the row is determined to contain the top of the subject's head. In another possible embodiment, the percentage of pixels associated with the subject portion 370 are computed, and evaluation proceeds until the percentage of pixels exceeds a threshold percentage, such as greater than 1% or greater than 5%. Once the row has been identified, the pixel row value is stored in memory.

Operation 420 evaluates the depth image to identify the bottom of at least one of the subject's feet. Operation 420 proceeds in a similar way to operation 418, except that processing begins at the bottom of image 302 and proceeds upward. The pixel row value (Y2) for the pixel row containing the bottom of the subject's feet is then stored in memory.

Operation 422 computes the distance in pixels between the top of the subject's head and the bottom of the subject's feet. In some embodiments, the distance is computed by subtracting the top of the head pixel row value (e.g., 137) from the bottom of the feet pixel row value (e.g., 785), to generate the height of the subject in pixels (e.g., 785−137=648).

Operation 414 determines the subject's distance away from the device used to capture the image respective image. In this example, the depth image 306 is used, and so operation 414 determines the distance between the subject S and the depth and position detection device 104. The depth image 306 can be used to determine this distance, because the depth image 306 contains the distance data (or other data that can be used to determine the distance data). But, the distance data will vary across the subject depending on the subject's position, and also due to the three-dimensional shape of the subject. In some embodiments, an average distance is therefore computed by evaluating the distances associated with the subject portion 370 of the depth image 306. Alternatively, a distance of a particular part of the body (e.g., center of the head, center of the torso, etc.) can be used.

Once the subject height in pixels has been determined (operation 412), and the subject distance is known (operation 414), operation 416 is performed to compute the actual subject height.

The subject's height in pixels is directly proportional to the subject's distance away from the device. Therefore, the subject's actual height can be determined by the following formula:

(Subject's Actual Height)=(Subject Distance)×(Subject's Pixel Height)×(Constant)   Equation 1:

The constant can be determined by using a subject of known height. In some embodiments, the formula is modified to account for parallax and lens distortion effects, as necessary.

In addition to subject height, the subject's weight can also be estimated, if desired, such as described in more detail herein.

Figure 16:
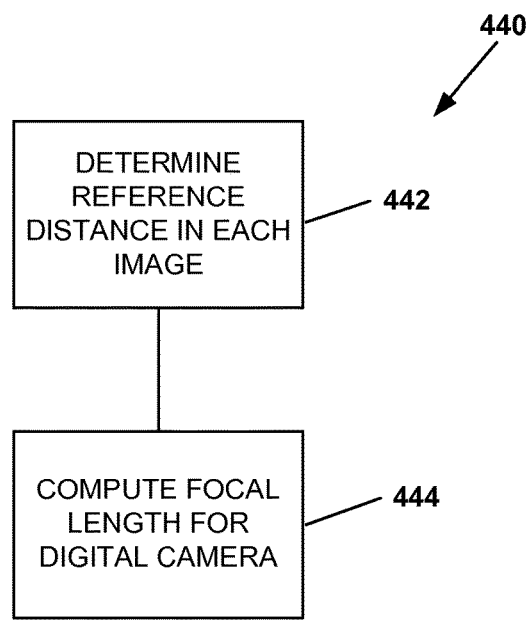
FIG. 16 is a flow chart illustrating an example method of determining a focal length of the digital camera shown in FIG. 3.
Figure 17:
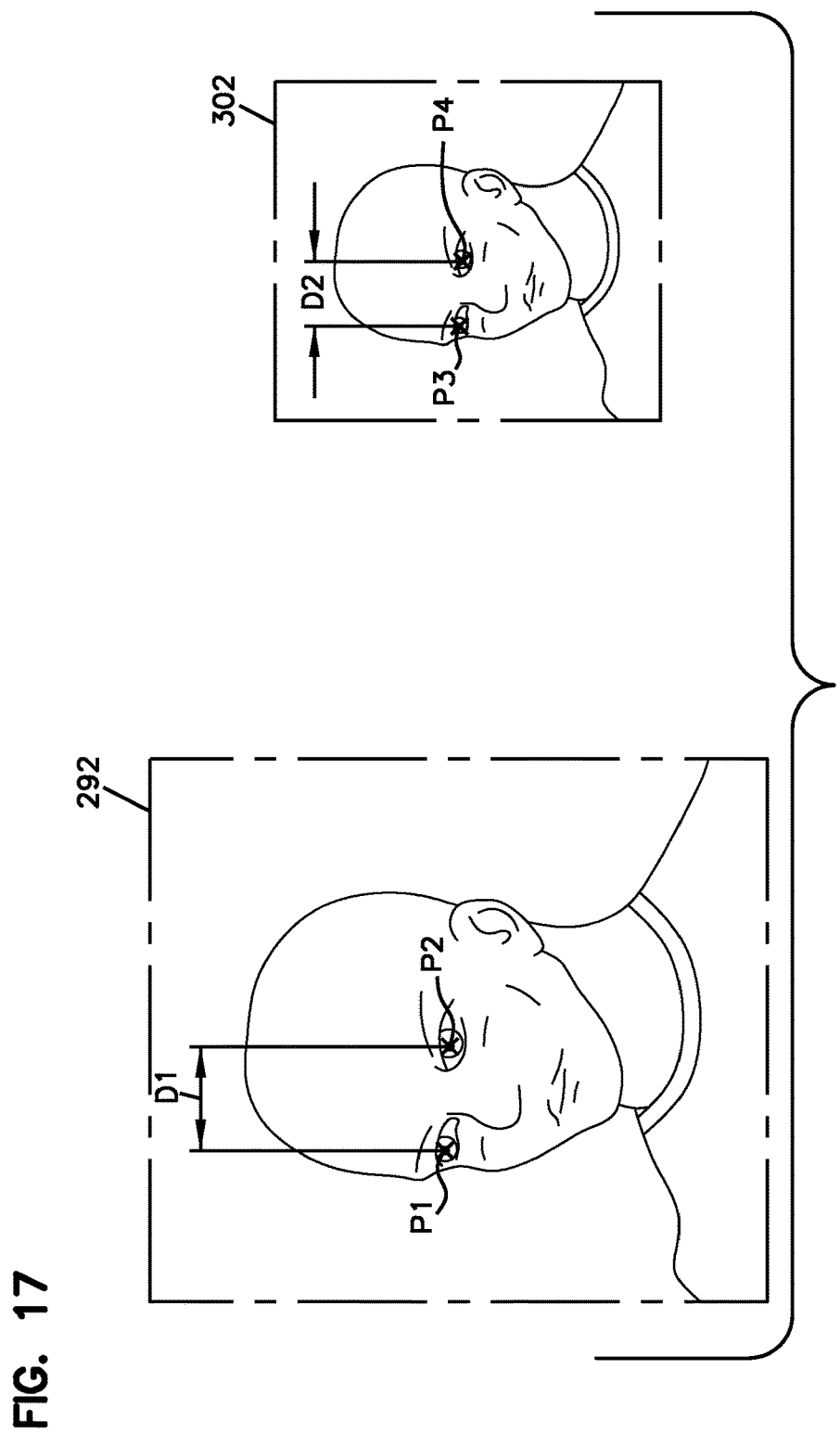
FIG. 17 graphically illustrates operations of the method shown in FIG. 16.

FIGS. 16-17 illustrate an example of the focal length determination engine 394, shown in FIG. 11. FIG. 16 is a flow chart illustrating an example method 440 of determining a focal length of a digital camera. FIG. 17 graphically illustrates operations of the example method 440, as performed using images 292 and images 302. Only portions of images 292 and 302 are depicted in FIG. 17.

Referring to FIG. 16, the example method 440 includes operations 442 and 444. The method 440 evaluates and compares two digital images captured by different image capture devices. Knowing the focal length of one of the two image capture devices, the focal length of the other image capture device is determined.

In this example, operation 442 is performed to determine reference distances in the digital image 292 and in the digital image 302. The reference distances are the distance between any two features that can be determined in both of the digital images 292 and 302.

In some embodiments, the reference distances are the distances between the subject's eyes in the digital images 292 and 302. For example, face finding software can be used to determine the (X,Y) coordinates for the center of each of the subject's eyes. An example of a commercially available face finding software is the VisPro-ware Software Development Kit distributed by Cryptometrics, Inc. of Tuckahoe, N.Y.

Referring to FIG. 17, points P1 and P2 are identified as the center of the subject's eyes in the digital image 292, and points P3 and P4 are identified as the center of the subject's eyes in the digital image 302. Other points are used in other embodiments to generate the reference distances.

The distance between these points is then computed for each digital image 292 and 302. Referring to FIG. 17, the distance D1 is the distance between the centers of the subject's eyes in the digital image 292, which is computed as the distance between point P2 and point P1. The distance D2 is the distance between the centers of the subject's eyes in the digital image 302, which is computed as the distance between point P4 and point P3.

Referring back to FIG. 16, after the reference distances are computed in operation 442, operation 444 is then performed. Operation 444 computes the focal length of digital camera 102 using the reference distances computed in operation 442.

The focal lengths of digital camera 102 and digital camera 172 (of the depth and position detection device shown in FIG. 5) are related according to the following formula:

(Distance $D1$)/(Distance $D2$)=(Focal Length $L1$)/(Focal Length $L2$)   Equation 2:

where L1 is the focal length of digital camera 102, and L2 is the focal length of digital camera 172.

The focal length of digital camera 172 is a fixed focal length, in some embodiments. Knowing the fixed focal length of digital camera 172, and the distances D1 and D2, the focal length L2 of digital camera 172 can be computed. More specifically, the following formula can be used:

(Focal Length $L1$)=((Distance $D1$)/(Distance $D2$))×(Focal Length $L2$)

In some embodiments, the formula is modified to account for parallax effects and axis alignment issues, as necessary.

Figure 18:
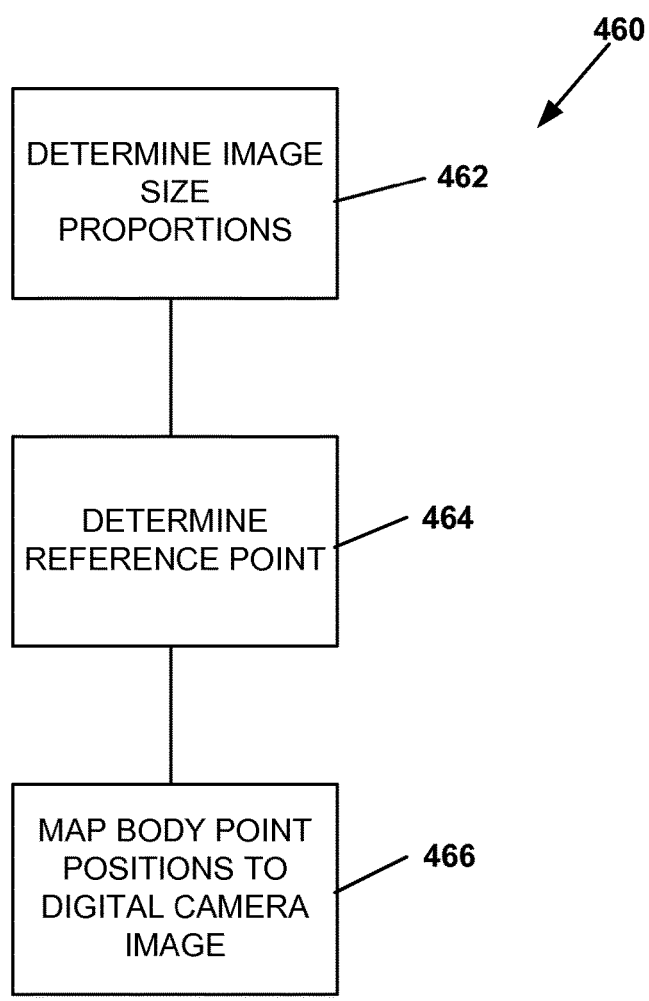
FIG. 18 is a flow chart illustrating an example method of mapping body point positions between digital images.
Figure 19:
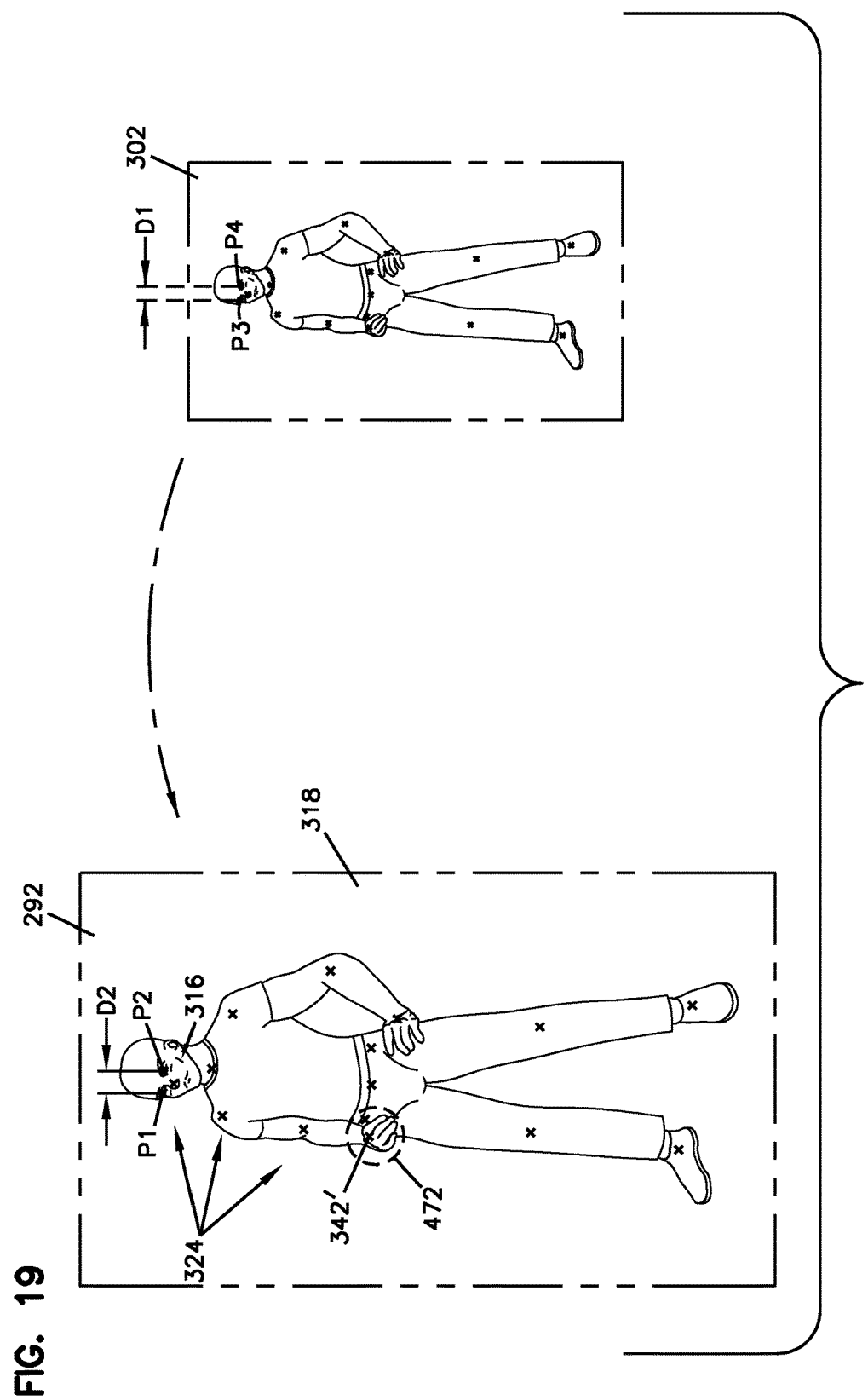
FIG. 19 graphically illustrates operations of the method shown in FIG. 18.

FIGS. 18-19 illustrate an example of the body point mapping engine 396, as shown in FIG. 13. FIG. 18 is a flow chart illustrating an example method 460 of mapping body point positions between a digital image 302 captured by digital camera 172 of the depth and position detection device 104, and a digital image 292 captured by digital camera 102. FIG. 19 graphically illustrates operations of method 460, including the digital images 292 and 302.

The method 460 includes operation 462, in which the size proportions between digital images 292 and 302 are determined. In an example embodiment, operation 462 is first performed in the same way as operation 442, illustrated and described with reference to FIG. 16 herein, which computes reference distances for each image 292 and 302 (such as the distances D1 and D2 between the centers of the subject's eyes).

Once the reference distances are known, the image size proportions are determined, such as using the following equation:

(Image Size Proportion)=(Distance $D1$)/(Distance $D2$)  Equation 4:

Operation 464 is performed to identify a reference point in the digital images 292 and 302. The reference point is helpful in embodiments in which the digital image 292 and 302 are not commonly aligned, to provide a common reference point from which other points can be measured.

In this example, the reference point is located at the center of the subject's right eye (points P1 and P3). Any other point can alternatively be used that is identifiable in both of digital images 292 and 302.

Operation 466 is then performed to map body point positions from the digital image 302 to the digital image 292. The body point positions for the digital image 302 are identified in the body point position data 304, for example, which are illustrated and described in more detail with reference to FIGS. 8 and 9.

For each body point to be mapped, the position of the body point in the digital image 302 is compared with the reference point P3 to compute a delta X and a delta Y between the points. Delta X is the difference between the X-coordinates of the body point to be mapped and the reference point, and delta Y is the difference between the Y-coordinates.

The body points can then be mapped using the following equations:

(Body Point Position $X'$)=(Body Point Position $X$)+ ((Delta $X$)×(Image Size Proportion))  Equation 5:

(Body Point Position $Y'$)=(Body Point Position $Y$)+ ((Delta $Y$)×(Image Size Proportion))  Equation 6:

Where X and Y are the coordinates (X,Y) of the body point in the digital image 302, and where X' and Y' are the coordinates (X',Y') of the body point in the digital image 292.

The above equations can be modified in some embodiments to account for parallax and lens distortion effects, as needed.

This process can be repeated for all of the body point position data 304, such as the body points 324 illustrated in FIG. 9, to determine the corresponding body points 324 on the digital image 292. The mapped body point positions are then saved in memory for subsequent use.

It is sometimes desirable to have more than a single point for a given body part, such as the hands and the feet, such as to ensure that the hands and feet are not inadvertently cut off during a cropping operation. As a result, some embodiments perform additional processing to identify all pixels corresponding to a portion of the subject's body.

For example, in some embodiments the hand point 342' is identified in the digital image 292 using method 460. To identify additional hand pixels, a range of pixels 472 surrounding the hand point 342' is identified, such as having a radius of a predetermined number of pixels. Alternatively, the radius can be determined as a multiple or fraction of the reference distance D1.

The pixels within the identified range of pixels 472 surrounding the body point 342' are then evaluated to identify pixels having a skin color. This can be performed by identifying those pixels that have a color near the same color as skin in the hue portion of the hue, saturation, and value (HSV) color space (also sometimes referred to as hue, saturation, and brightness (HSB). In some embodiments, portions of image 292 that are determined to be part of the background portion 318 of the digital image are not evaluated. The resulting pixels are then stored and associated with the right hand body point 342' for subsequent use.

Figure 20:
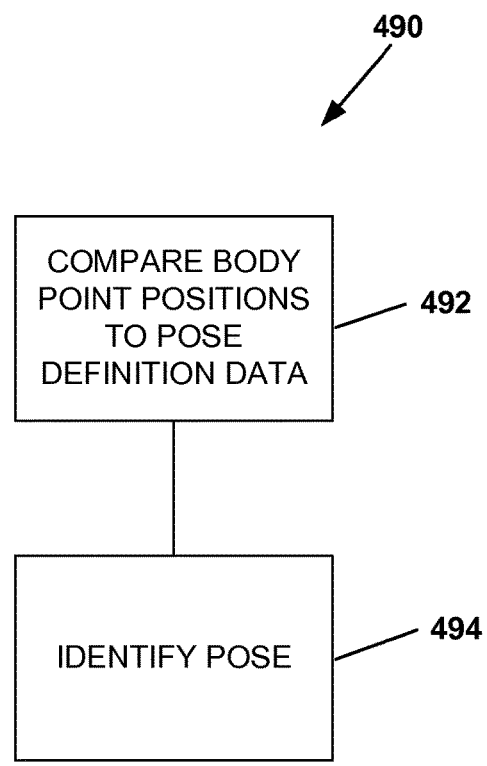
FIG. 20 is a flow chart illustrating an example method of identifying a pose of a subject in a digital image.
Figure 21:
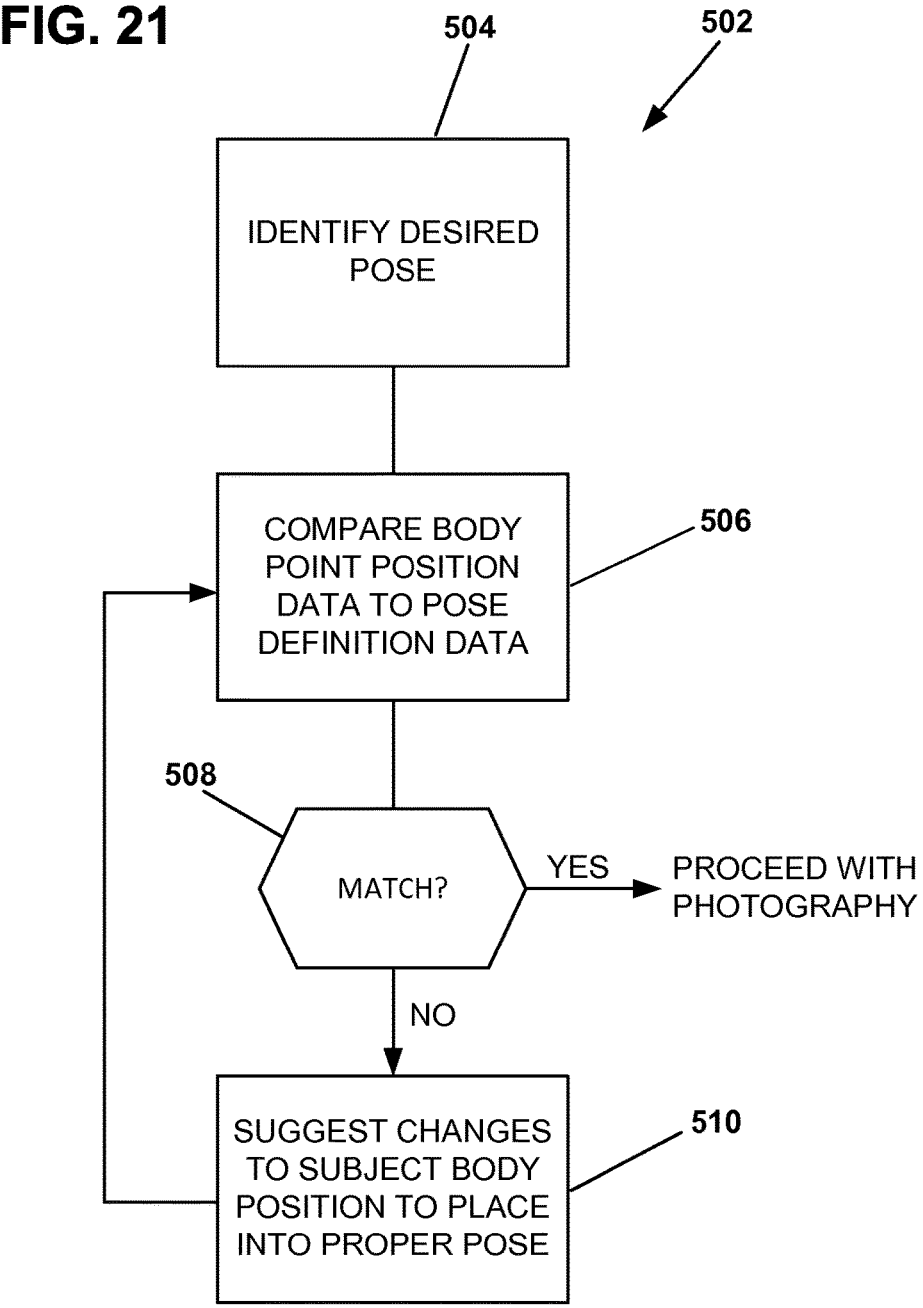
FIG. 21 is a flow chart illustrating a method of evaluating a subject's pose during a photography session.

FIGS. 20-21 illustrate examples of the pose identification engine 398, shown in FIG. 13. FIG. 20 is a flow chart illustrating a first example of the pose identification engine 398. FIG. 21 is a flow chart illustrating a second example of the pose identification engine 398.

FIG. 20 is a flow chart illustrating an example method 490 of identifying a pose of a subject S in a digital image. The method 490 includes operations 492 and 494.

Operation 492 utilizes the body point position data 304 (or the body point positions mapped to image 292, described above) and compares this data 304 to pose definition data.

The pose definition data defines a set of poses by the relative positions of the subject's body parts to each other. As one example, the pose definition data includes a set of standing poses and a set of sitting poses. The pose definition data differentiates between the standing and sitting poses by the positions of portions of the body. For example, a standing pose may be defined by the location of the hips being much higher than the location of the knees. An example is provided in Equation 7.

($\Delta Y > 0.25$ M)  Equation 7:

where $\Delta Y$ is the difference between the Y coordinate of the hips (e.g., a center of the hips, or another hip point) and the Y coordinate of the knees (e.g., an average of the two knee points, or one or the other of the knee points), and where M represents meters.

As another example, the pose definition data can be defined by the location of the hips being at approximately the same height as the location of the hips. An example is provided in Equation 8.

($\Delta Y < 0.25$ M)  Equation 8:

In addition, each of the standing and sitting sets of poses can be further defined by having the arms crossed or arms uncrossed. The pose definition data can define an arms crossed pose as any pose in which lines drawn between the subject's left hands, elbows, and shoulders intersect with lines drawn between the subject's right hands, elbows, and shoulders, for example. Additional, different, or fewer pose definitions can be included in other embodiments.

Operation 494 is performed to identify the pose based on the results of operation 492. For example, operation 492 identifies the subject in the digital image 302 as standing with arms uncrossed, as in the example shown in FIG. 9. In some embodiments each pose is given a unique identifier. The pose, and/or the unique identifier are stored in memory for subsequent processing. In some embodiments, the pose identifier is stored in metadata of the digital image 292, or otherwise associated with the digital image 292.

FIG. 21 illustrates an example method 502 of evaluating a subject's pose during a photography session. In this example, method 502 includes operations 504, 506, 508, and 510.

Operation 504 is performed in some embodiments to identify a desired pose. For example, a set of poses is presented to the photographer P (or to the subject S, both shown in FIG. 1), and a selection of a desired pose is received in response. The poses can be displayed on computing device 106, for example, as a selectable menu. The poses could alternatively be presented audibly through a speaker, and the responses received through a microphone and processed using voice recognition technology.

In yet another possible embodiment, a set of poses may be organized in a predetermined order, such that a first pose is automatically selected by the computing device 106 at the start of a photography session, and poses then advanced sequentially according to the predetermined order as they are completed.

In yet another possible embodiment, the current body point positions of a subject S can be compared to pose definition data to identify a pose that most closely matches the subject's current pose. That pose is then identified as the desired pose for operation 504.

Once the desired pose is identified in operation 504, operation 506 is performed to compare the body point positions of the subject S with the pose definition data. In this case, the operation 504 only compares the body point positions to the pose data for the pose identified in operation 504.

Operation 508 is then performed to determine whether the body point positions of the subject S match the pose definition data, based on the comparison made in operation 506. If the body point positions match the pose definition data, photography is allowed to proceed. In some embodiments, the photography station operates in a shutter inhibit mode in which the digital camera 102 is prevented from capturing a photograph until the pose has been verified in operation 508. In some embodiments, the digital camera 102 has a shutter lock mode that the camera 102 operates in until released by the computing device 106.

In some embodiments, if the body point positions are determined to not match the pose definition data, operation 510 is performed to suggest changes in the body position of the subject S that would place the subject S into the proper pose, so that the body point positions would match the pose definition data for the identified pose. The suggestions might suggest that the subject's head be tilted to the left, for example, or that the subject's arms should be crossed or uncrossed.

Operations 506, 508, and 510 can be repeated until operation 508 determines that the subject's pose properly matches the pose definition data. Some embodiments permit the photographer to bypass the pose verification process to proceed with photographing the subject S, by selecting a manual override option on the computing device 106 or the handheld control 111, for example.

Figure 22:
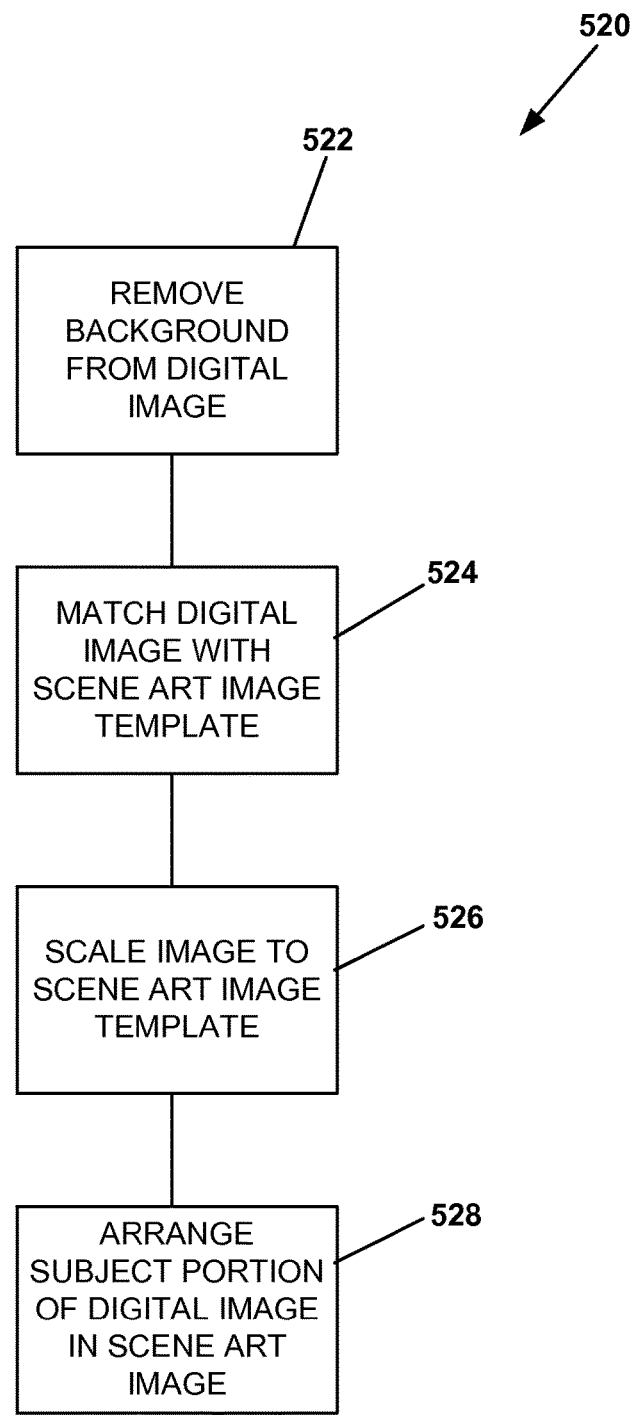
FIG. 22 is a flow chart illustrating an example method of inserting a subject into a background art image.
Figure 23:
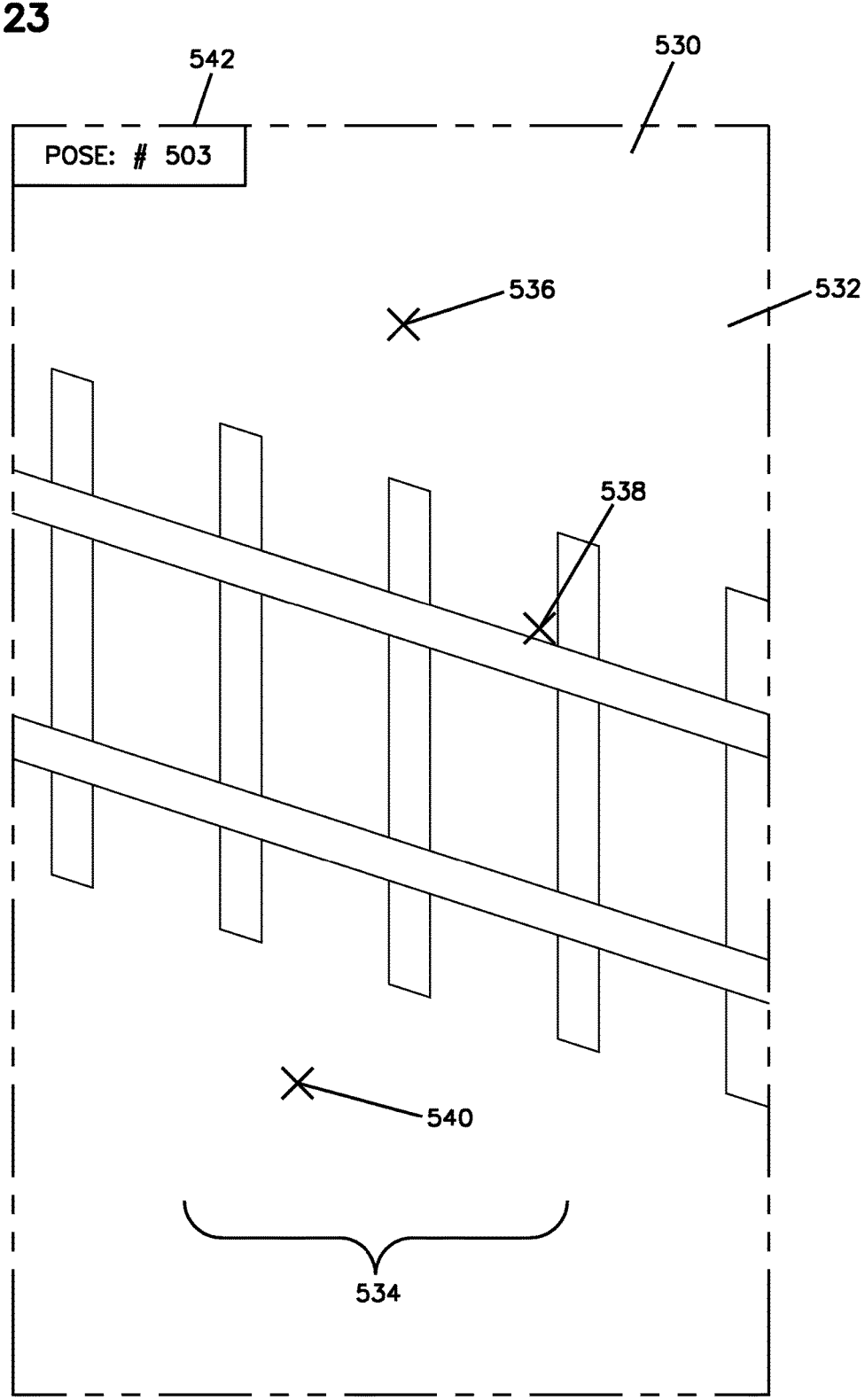
FIG. 23 illustrates an example of a background art image template.
Figure 24:
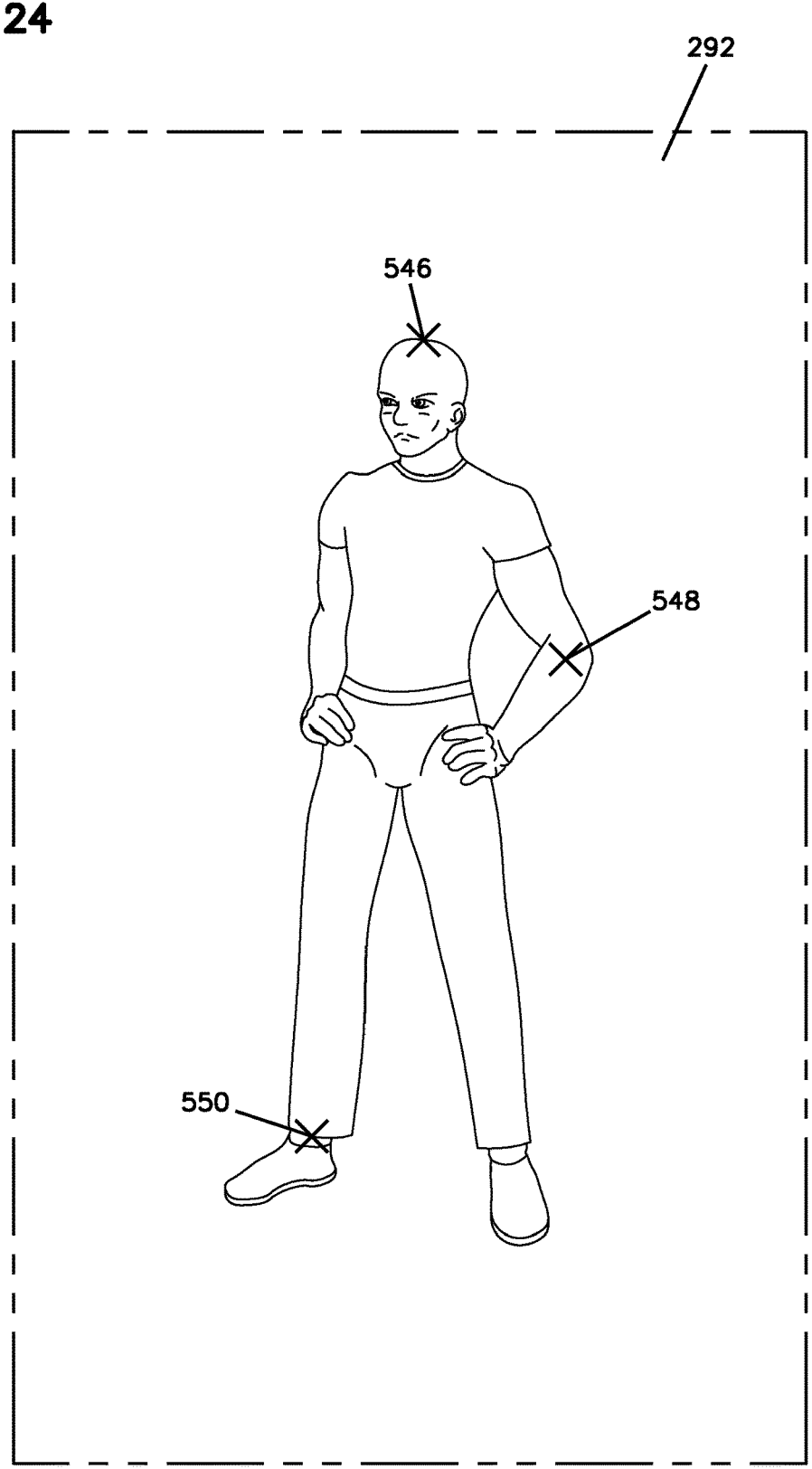
FIG. 24 illustrates an example of a digital image including several identified body point positions.
Figure 25:
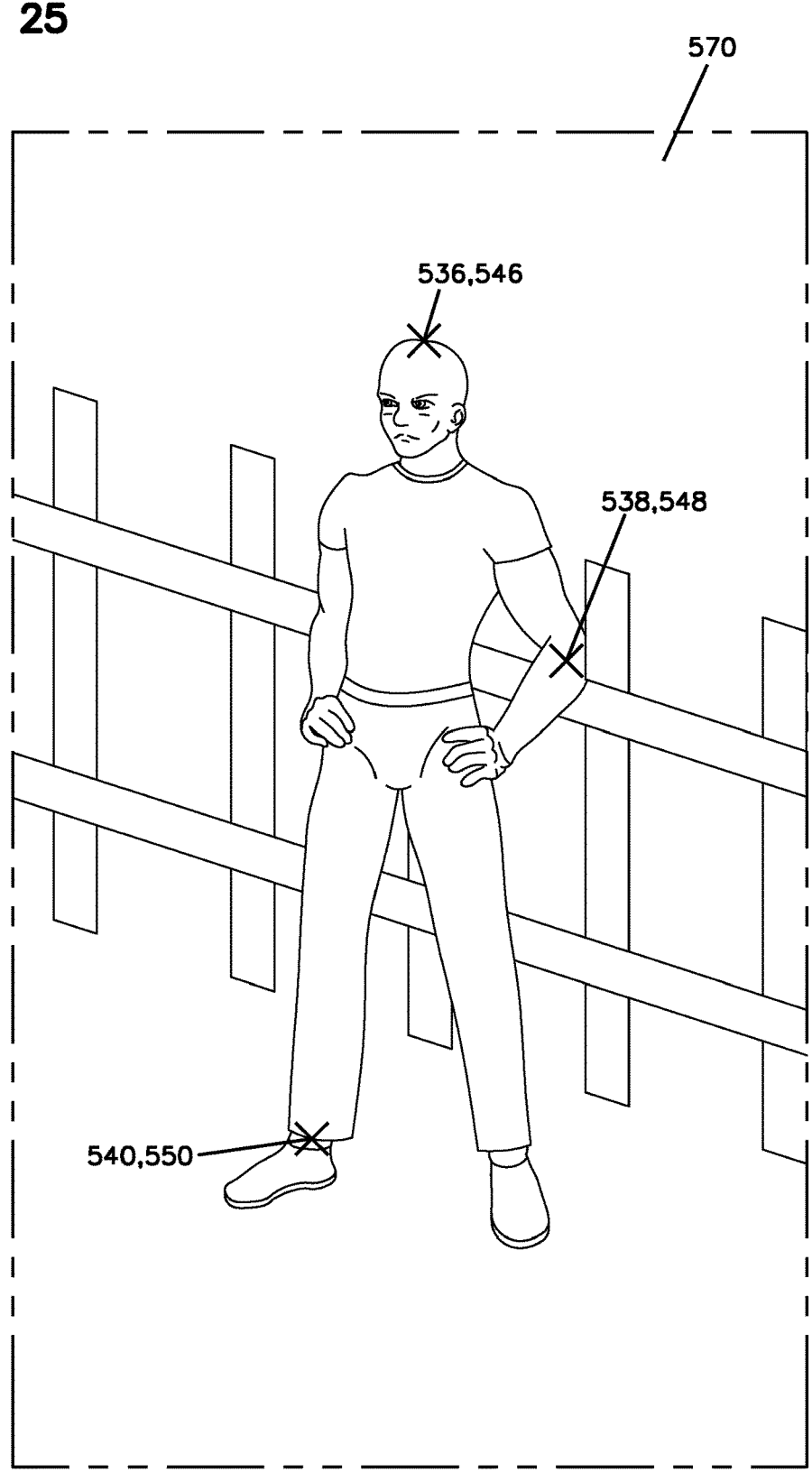
FIG. 25 illustrates a final product in which the subject is inserted into the background art image.

FIGS. 22-25 illustrate an example of the subject insertion engine 400, shown in FIG. 13. FIG. 22 is a flow chart illustrating an example method 520 of inserting a subject into a scene art image. FIG. 23 illustrates an example of a scene art image template 530. FIG. 24 illustrates an example of the digital image 292 including several identified body point positions. FIG. 25 illustrates an example of the subject inserted into the scene art image.

Referring to FIG. 22, the example method 520 includes operations 522, 524, 526, and 528.

Operation 522 is performed to remove the background portion of the digital image 292, or alternatively to extract the subject portion from the digital image 292. Operation 522 can be performed utilizing the background replacement techniques described herein.

Operation 524 is performed to match the digital image 292 with a scene art image template 530. An example of a scene art image template 530 is illustrated in FIG. 23, and includes a scene art image 532, and body point position data 534. The scene art image 532 can include background or foreground components that appear to be forward, behind, or adjacent to the subject. The body point position data 534 includes, for example, a top of head point position 536, a left elbow point position 538, and a right ankle point position 540.

In some embodiments, the scene art image template 530 includes a pose identifier 542. The pose identifier 542 can be stored in metadata of the scene art image 532, or in data of the scene art image template 530, for example. In this example, the pose identifier 542 is "S03" which is assigned to a standing pose with the right arm bent at the elbow. The pose identifier 542 indicates that the scene art image template 530 is best suited for a digital image in which the subject is standing and has the right arm bent at the elbow.

Operation 524 is performed in some embodiments to automatically identify one or more templates that match a given digital image 292. In other embodiments, the operation 524 is performed to automatically identify one or more digital images 292 that have a pose suitable for a given scene art image template 530.

In this example, the scene art image template 530 and the digital image 292 are determined to be a suitable match.

Operation 526 is then performed to scale the digital image 292 in preparation for insertion into the scene art image 532. In one example, the scene art image template 530 includes top of head point position 536 and right ankle point position 540 points that assist with appropriate placement and scaling of the subject into the image.

The corresponding top of head point 546 and right ankle point 550 are determined for the digital image 292, such as using the process illustrated and described with reference to FIGS. 14 and 15. The resulting points 546 and 550 are illustrated in FIG. 25.

Scaling is then performed on the subject portion of the digital image 292 so that the pixel height between points 546 and 550 matches the pixel height between top of head point position 536 and right ankle point position 540 of scene art image template 530.

Operation 528 is then performed to arrange the subject portion of the digital image 292 into the scene art image 532. In this example, operation 528 utilizes the body point position data 534 provided by the scene art image template 530.

In this example, the subject needs to be precisely positioned with respect to a fence in the scene art image 532, so that the elbow appears to be resting on the fence. To do so, the right arm body point 548 identified in the digital image 292 is positioned at the left elbow point position 538 provided by the scene art image template 530.

Background replacement techniques are then used to insert the subject portion of the digital image 292 into the scene art image 532, such as to blend pixels corresponding to the transition between the subject portion and the scene art image 532 together to form a more natural looking and high quality composite image 570. An example of the composite image 570 is illustrated in FIG. 25.

Figure 26:
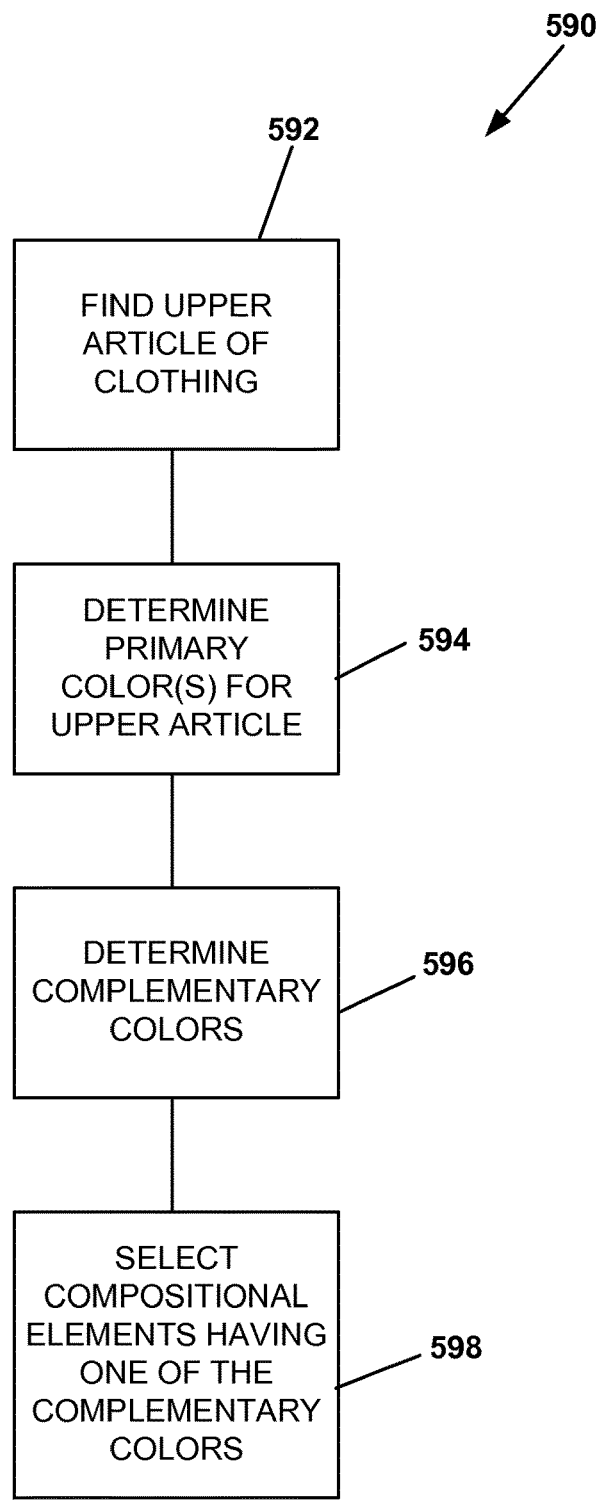
FIG. 26 is a flow chart illustrating an example method of selecting compositional elements for a photography product.
Figure 27:
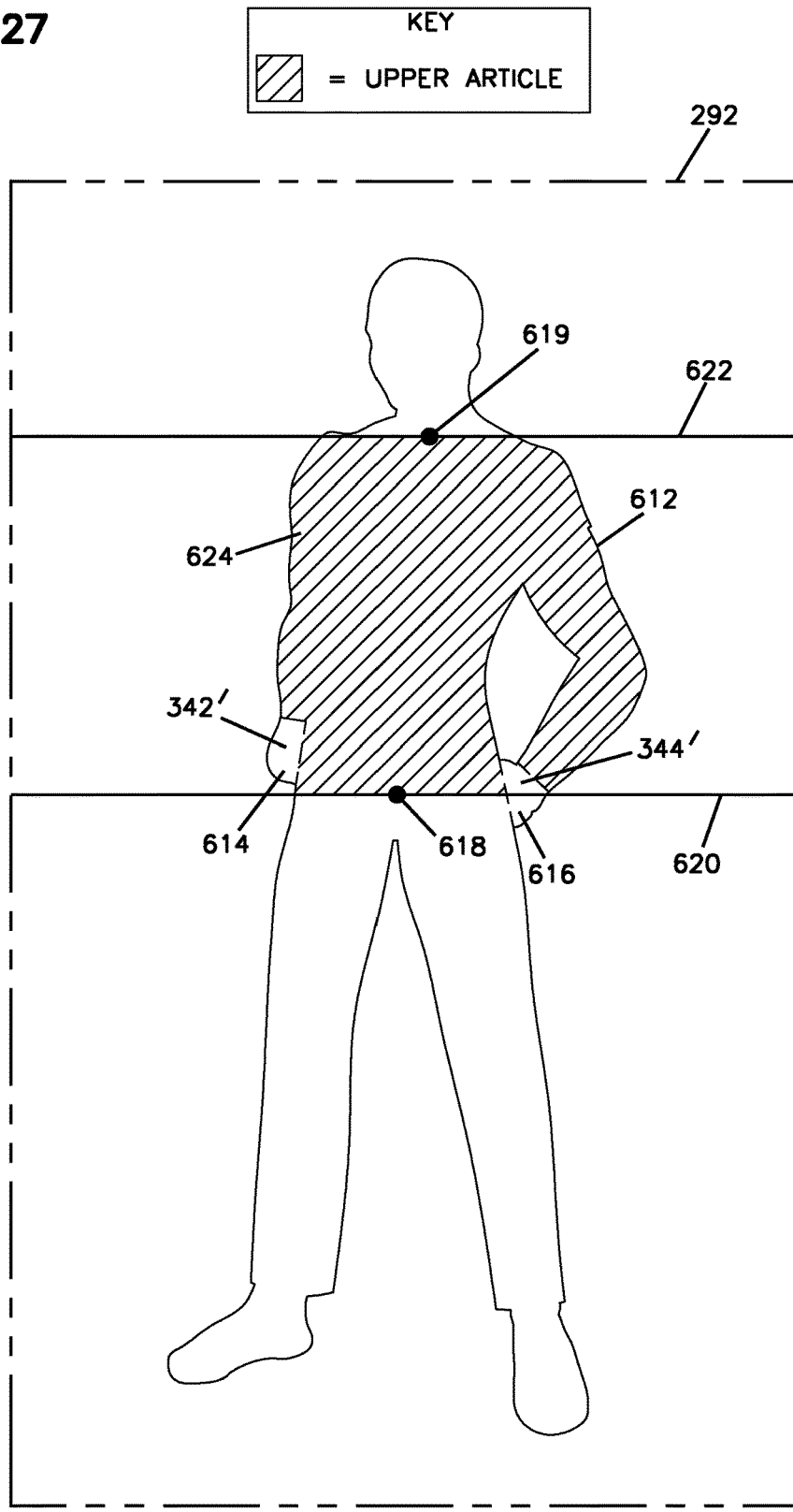
FIG. 27 illustrates exemplary operations that can be performed on a digital image, such as to identify a color of an article of clothing worn by a subject.

FIGS. 26-27 illustrate techniques for selecting complementary compositional elements for a photography product. FIG. 26 is a flow chart illustrating an exemplary method 590 of selecting compositional elements. In this example, the method 590 includes operations 592, 594, 596, and 598. Operations 592 and 594 also illustrate an exemplary method of determining subject clothing color. FIG. 26 illustrates exemplary operations of the method 590 with respect to a digital image 292.

Referring first to FIG. 26, the operation 592 is performed to find an upper article of clothing in a digital image 292, such as in the digital image 292 (shown in FIG. 8). The upper article of clothing is the article that the subject is wearing on the upper torso, such as a shirt, blouse, jacket or upper portion of a dress. If multiple articles of clothing are visible (such as a shirt with an open jacket), then the upper article of clothing includes all of the visible articles.

In one example embodiment, the digital image 292 is evaluated along with data generated from the depth and position detection device 104, in order to identify the portion of the digital image 292 that contains the upper article of clothing. An example of operation 592 is illustrated and described in more detail with reference to FIG. 25.

Once the upper article of clothing has been identified, the operation 594 is performed to determine the one or more primary colors of the upper article. The operation 594 involves evaluating the colors of pixels determined to contain the upper article of clothing, and then identifying the primary one or more colors within those pixels. In some embodiments a single color is identified as the primary color. In other embodiments multiple colors are identified as the primary colors. For example, the primary colors can include the primary 1 to 4 colors. An example of operation 594 is described in more detail with reference to FIG. 27.

In some embodiments, operations 592 and 594 are performed to determine primary color(s) for a lower article of clothing, such as a pair of pants, a skirt, a lower portion of a dress, etc. These colors can be used in addition to or instead of the colors for the upper article of clothing for subsequent operations.

The operation 596 is then performed in some embodiments to determine one or more colors that are complementary to the one or more colors of the upper article of clothing in the digital image 292. In some embodiments, the selection of complementary colors is determined based on one or more complementary color selection rules. For example, a color wheel can be used to identify complementary colors. In some embodiments, the clothing color is identified on the color wheel, and one or more complementary colors are then identified using the color wheel. For example, in some embodiments a complementary color is a color that is directly opposite the clothing color on the color wheel. Other color combinations can be used in other embodiments. Also, in some embodiments the complementary color can be the same as the clothing color.

Once the one or more complementary colors have been identified, some embodiments include the operation 598 to select one or more compositional elements that include the complementary color. Examples of compositional elements include a border, a graphic, a text element, a background, a foreground object, or any other element that can be added to or included with a photography product.

The end result is a photography product with a pleasing visual appearance due to the color of the one or more compositional elements complementing the color(s) of the subject's clothing.

FIG. 27 illustrates exemplary operations that can be performed on a digital image 292, such as to identify a color of an article of clothing worn by a subject.

An example of the operation 592 (FIG. 26) is illustrated in FIG. 27, which operates to find an upper article of clothing. In this example, the location of the upper article of clothing is first identified.

In one example, the digital image is first evaluated to remove those portions of the digital image 292 that are not part of the subject. The subject portion 612 of the image can be determined by mapping the subject portion 370 of the depth image 306 to the digital image 292. Those pixels that are not part of the subject portion 612 can then be removed or ignored for subsequent evaluation, since the upper article of clothing is worn on the subject.

Other embodiments utilize other techniques for distinguishing the subject portion of the image from the background portion of the image. For example, background replacement techniques can be used as discussed herein. In another possible embodiment, chroma key (e.g., blue screen, green screen, etc.) technology can be used to distinguish the subject portion of the digital image 292 from the background portion.

The resulting subject portion of the image may contain additional portions of the subject, and so additional steps can be performed to remove those additional portions. For example, in some embodiments the subject's hands are located and evaluated to determine whether they are skin-colored. The hands are not necessarily skin colored, such as when the subject's hands are in his or her pockets, or hidden behind another article of clothing.

The locations of the hands are first identified by mapping the right and left hand points 342 and 344 (FIG. 9) from the body points 324 identified by the depth and position detection device 104 to the digital image 292. Once the hand points 342' and 344' are identified the region surrounding the hand points 342' and 344' are evaluated to remove any pixels that contain skin tones. For example, the pixels are evaluated to identify those pixels (such as in regions 614 and 616) that have a color near the same color as skin in the hue portion of the HSV color space. Any pixels connected to these that continue to have skin tone can be further removed. For example, if the subject is wearing a sleeveless shirt, a continuous region of skin pixels will be found beginning in the region of the hands and proceeding along the arm and up to the shoulder. These pixels are removed from subsequent consideration. Some embodiments utilize image processing dilation techniques.

Additionally, any other pixels within the subject portion that contain skin tones can be similarly removed from subsequent processing.

An upper article of clothing typically extends from the top of the shoulders to at or below the hips. In one example a hip center point 618 and a shoulder center point 619 are identified. Horizontal lines are then defined that extend through these points, including the hip line 620 and the shoulder line 622. Portions of the digital image 292 that are below the hip line 620 or above the shoulder line 622 are removed from subsequent processing, leaving those portions of the subject containing the upper article of clothing 624.

Once the upper article of clothing 624 has been identified, operation 594 (FIG. 24) is performed to determine the primary color(s) for the upper article.

In some embodiments, the upper article of clothing 624 in the digital image 292 is first evaluated in operation 594 to generate a two dimensional histogram on the pixels containing the upper article of clothing 624. In some embodiments, the histogram is generated after converting the digital image 292 into the Lab color space. A low pass filter operation can be applied to the results to smooth the histogram. Peaks in the histogram represent the primary colors of the upper article of clothing. The highest peak indicates the color that is most prevalent in the upper article of clothing, and the next highest peak indicates the color that is the next most prevalent, etc. Any number of colors present in the upper article of clothing can be identified by selecting the peaks from highest to lowest. The colors can then be converted back into the RGB color space using a predetermined luminance value, if desired.

As noted herein, the same process can be used to identify a lower article of clothing, such as pants, shorts, a skirt, etc. However, instead of using shoulder center points, an ankle center point and associated ankle line are defined. The lower article of clothing is found between the hip line and the ankle line. The ankle points can also be used to check for and remove visible skin tones, rather than the hand points used for the upper article of clothing.

Some embodiments include a subject weight determination engine 404 as shown in FIG. 13. The subject weight determination engine operates to compute an estimate of the subject's weight. The weight can be helpful in generating photography products that complement the subject's physical characteristics. For example, if the subject is very tall and thin, it may be desirable to compose the photography products associated with that subject different than a person who is shorter and wider.

In one example embodiment, computation of the estimated weight begins by determining the number of pixels in the depth image 306 (shown in FIGS. 10-12) that contain the subject portion 370. In other words, the operation computes the number of pixels in the depth image 306 in which the subject ID 366 (FIG. 10) is set to "1", for example. An estimate of the three-dimensional volume of the subject, measured in pixels, can be computed by raising the number of pixels to a power in a range from 1.5 to 2.5. If the subject's body is facing the camera, then the pixel volume can be computed by raising the number of pixels to a power in a range from about 1.5 to about 1.9 because the human body is typically wider than it is deep. However, if the subject is facing sideways to the camera, then the pixel volume can be computed by raising the number of pixels to a power in a range from about 2.1 to about 2.5, because the visible depth of the subject is likely to be less than the width of the subject.

Once the subject's volume has been computed in pixels, this volume can be converted into an actual estimate of volume, such as in $cm^2$ or $m^2$. For example, the pixel volume is multiplied by the square of the subject's distance from the depth and position detection device.

If desired, an estimate of the subject's weight can be computed by multiplying the subject's volume by an empirically determined constant based on the average weight per unit volume of a human being.

In another example embodiment, computation of the weight estimate utilizes the depth information from the depth image 306 (FIGS. 10-12). In this example, the subject portion 370 of the depth image (i.e., those having a subject ID 366 of "1") is used to compute an estimate of the subject's volume.

For example, an operation is performed to identify the pixel in the subject portion having the greatest depth (e.g., the largest Z-coordinate value). Then, the depth of each subject pixel is computed compared with the greatest depth (e.g., pixel Z-coordinate value—largest Z-coordinate value). The depth is then multiplied by the square of the physical size of a pixel. The physical size of a pixel is determined, for example, by dividing the subject's actual height (which can be determined as disclosed herein) by the number of vertical subject pixels in the depth image 306. This provides the subject volume for a single pixel, which can then be added with the subject volume of each additional subject pixel to compute the total measured volume of the subject. However, because the depth and position detection device only views the subject from one side, the other side of the subject is not measured, and the total measured volume is only about half of the actual subject's volume. To account for this, the measured volume is multiplied by a constant to compute an estimate of the subject's volume. In some embodiments the constant is in a range from about 1.5 to less than 2, assuming that the subject is facing the camera, because the back side of a human typically has a lower volume than the front side of a human.

The subject's volume can then be multiplied by an average subject density to generate an estimate of the subject's weight. For example, the human body has a density of about 1 gram per cubic centimeter (1000 kilograms/cubic meter). So, if the units of distance were meters, the subject's volume can be multiplied by 1000 to obtain an estimate of the subject's weight in kilograms.

Other embodiments use other techniques for estimating the subject's volume. For example, a second depth and position detection device could be used to measure the depth of the subject from another direction, such as from one side or the other.

As discussed above, the weight or volume information can be used to select photographic products that complement the subject. The weight or volume information can also be combined with other known information to identify the subject's body type. For example, the body type can be determined from a height and weight ratio, and used to select or generate appropriate photographic products. As an example, a background having a higher contrast may be selected for a subject with a thinner body type, while a background having a lower contrast may be selected for a subject with a wider body type. As another example, cropping and/or tilting can be adjusted based on the subject's weight or body type. As a further example, background colors can be selected based on the subject's weight or body type.

As another example, the body type information can be used for generating group composite images. For example, the body type information can be used as part of an automated subject arrangement process, such as to arrange those with wider body types at least partially behind one or more other subjects, providing a more uniform appearance in the photographic product. Similarly, those with thinner body types can be arranged forward of other subjects.

Some embodiments include one or more of the following:

A system comprising a digital camera arranged and configured to capture a digital image of a subject and a background during a portrait photography session; a depth detector comprising a second digital camera, wherein the depth detector is arranged and configured to detect distances that the subject and the background are away from the depth detector when the digital image is captured by the digital camera, and to generate depth data based on the distances; and a computing device arranged and configured to receive the digital image from the digital camera and the depth data from the depth detector and store the digital image and the depth data in a computer readable storage device.

A system wherein the depth detector further comprises a light source that generates infrared light, and a depth sensor that detects the infrared light reflected from the subject and the background.

A system wherein the depth detector is a depth and position detection device, wherein the depth and position detection device is arranged and configured to: identify the subject; identify body points on the subject; and generate a skeletal model of the subject.

A system wherein the computing device is further arranged and configured to map the body points to the digital image captured by the digital camera.

A photography method comprising: capturing a digital image of a subject and a background with a digital camera; detecting a distance between a depth detector and the subject and a distance between the depth detector and the background and generating depth data identifying the distances, wherein the depth detector comprises a second digital camera; and transferring the digital image and the depth data to a computing device and storing the depth data so that it is associated with the digital image in a computer readable storage medium.

A photography method further comprising mapping the depth data to the digital image prior to storing the depth data in the computer readable storage medium.

A method of determining a body position of a subject in a digital image, the method comprising: capturing the digital image and generating the depth data with the photography method, wherein the depth data further comprises data identifying body point positions of the subject's body; comparing one or more body point positions to pose definition data; and determining whether the one or more body point positions match the pose definition data.

A method further comprising: when the one or more body point positions do not match the pose position definition data, suggesting changes to the subject's body position to place the subject's body into the proper body position.

A method of inserting an image of a subject into a scene, the method comprising: capturing the digital image and generating the depth data with the photography method, wherein the depth data further comprises data identifying body point positions of the subject's body; separating a subject portion of the digital image from a background portion; identifying a scene art image template that is compatible with the body point positions of the subject in the digital image; scale the subject portion of the digital image to the scene art image template; and arrange subject portion of the digital image in the scene art image template based at least in part on at least one of the body point positions.

A method of identifying a characteristic of an article of clothing worn by a subject in a digital image, the method comprising: capturing the digital image and generating the depth data using the photography method, wherein the depth data further comprises data identifying body point positions of the subject's body; finding the article of clothing using at least some of the body point positions; and evaluating the characteristic of the article of clothing.

A method wherein the characteristic of the article of clothing is a primary color of the article of clothing.

A method of estimating a weight of a subject in a digital image, the method comprising: capturing the digital image of a subject; generating depth data defining distances associated with the subject; and computing an estimate of the subject's weight using the depth data.

A method of inserting an image of a subject into a scene, the method comprising: capturing the digital image and generating depth data identifying distances between objects captured in the digital image; separating a subject portion of the digital image from a background portion; determining at least one of: a primary color of an article of clothing worn by the subject and an estimate of the subject's weight; and arranging the subject portion of the digital image into a scene art image using at least one of the primary color and the estimate of the subject's weight.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A photography system capable of detecting a pose of a subject when a portrait photograph of the subject is captured and associating the pose to the portrait photograph, comprising:
   a portrait camera configured to generate a portrait image capturing a subject posing for a portrait photograph;
   one or more lights operable to illuminate the subject posing for the portrait photograph;
   a depth and position device configured to scan the subject and to generate depth and position data associated with the subject,
      wherein the depth and position data includes body point position data associated with the subject,
      wherein the depth and position device is further configured to capture a low-resolution digital image of the subject;
   a system controller operable to control the portrait camera, the one or more lights, and the depth and position device to synchronize illumination by the one or more lights, capturing of the portrait image of the subject, and scanning of the subject within a predetermined time difference; and
   a computing device configured to receive the depth and position data and the portrait image, wherein the computing device is configured to map the depth and position data onto to the subject in the portrait image, wherein the computing device is configured to calculate a size proportion between the portrait image and the low-resolution digital image,
   wherein the computing device is configured to map the body point position data associated with the subject from the low-resolution digital image to the subject in the portrait image based on the size proportion between the portrait image and the low-resolution digital image.

2. The photography system of claim 1, wherein the computing device is configured to identify a reference point in the portrait image and the low-resolution digital image, wherein the body point position data associated with the subject is mapped from the low-resolution digital image to the subject in the portrait image further based on the reference point in the portrait image and the low-resolution digital image.

3. The photography system of claim 1, wherein the depth and position device is configured to generate a skeletal model for the subject based on the body point position data associated with the subject,
   wherein the computing device is configured to map the skeletal model from the low-resolution digital image to the portrait image.

4. The photography system of claim 1, wherein the portrait image has a higher resolution than the low-resolution digital image.

5. The photography system of claim 1, wherein the portrait image includes a background, wherein the depth and position device is configured to scan the background, wherein the depth and position data is associated with the subject and the background, wherein the computing device is configured to map the depth and position data onto to the subject and the background in the portrait image.

6. The photography system of claim 1, wherein the depth and position device is configured to generate a depth image comprising graphical representations of the subject and the background, and respective depth data.

7. The photography system of claim 1, wherein the one or more lights include one or more of incandescent bulbs, fluorescent lamps, light-emitting diodes, and discharge lamps, operable to illuminate the subject posing for the portrait photograph and configured to be synchronized with the depth and position device by the system controller.

* * * * *